US011904366B2

(12) United States Patent
Athey

(10) Patent No.: US 11,904,366 B2
(45) Date of Patent: Feb. 20, 2024

(54) SYSTEMS AND METHODS OF CONTROLLING A CONCENTRATION OF MICROBUBBLES AND NANOBUBBLES OF A SOLUTION FOR TREATMENT OF A PRODUCT

(71) Applicant: En Solución, Inc., Austin, TX (US)

(72) Inventor: Alex Edward Athey, Austin, MN (US)

(73) Assignee: EN SOLUCIÓN, INC., Austin, TX (US)

( * ) Notice: Subject to any disclaimer, the term of this patent is extended or adjusted under 35 U.S.C. 154(b) by 44 days.

(21) Appl. No.: 17/437,822

(22) PCT Filed: Mar. 9, 2020

(86) PCT No.: PCT/US2020/021773
§ 371 (c)(1),
(2) Date: Sep. 9, 2021

(87) PCT Pub. No.: WO2020/185715
PCT Pub. Date: Sep. 17, 2020

(65) Prior Publication Data
US 2022/0152665 A1 May 19, 2022

Related U.S. Application Data

(63) Continuation-in-part of application No. 16/706,779, filed on Dec. 8, 2019, now abandoned.
(Continued)

(51) Int. Cl.
*B08B 3/10* (2006.01)
*B08B 3/08* (2006.01)
(Continued)

(52) U.S. Cl.
CPC .............. *B08B 3/102* (2013.01); *B08B 1/002* (2013.01); *B08B 3/022* (2013.01); *B08B 3/08* (2013.01); *A23N 12/023* (2013.01); *B08B 3/041* (2013.01)

(58) Field of Classification Search
CPC .. B01F 23/2373; B01F 23/2375; B08B 1/002; B08B 3/022; B08B 3/041; B08B 3/08; B08B 3/102; A23N 12/023
See application file for complete search history.

(56) References Cited

U.S. PATENT DOCUMENTS 4,549,477 A 10/1985 McCabe, Jr.
5,256,299 A 10/1993 Wang et al.
(Continued)

FOREIGN PATENT DOCUMENTS

CN 201388489 Y 1/2010
CN 203269933 U 11/2013
(Continued)

OTHER PUBLICATIONS

International Preliminary Report on Patentability issued in PCT Patent Application No. PCT/US2020/021773 dated Jun. 12, 2020.
(Continued)

*Primary Examiner* — Charles S Bushey
(74) *Attorney, Agent, or Firm* — MARSHALL, GERSTEIN & BORUN LLP

(57) ABSTRACT

A system may include a circulation subsystem and a circuit coupled to the circulation subsystem. The circuit may provide one or more signals to control the circulation subsystem to circulate a treatment solution including one or more of microbubbles or nanobubbles in a selected ratio. In one aspect, the nanobubbles may include a first gas, and the microbubbles may include a second gas. In another aspect, the treatment solution may include a first percentage of
(Continued)

US 11,904,366 B2

Page 2 nanobubbles and a second percentage of microbubbles. In another aspect, mechanical agitation can be applied to the solution on an object to assist in cleaning.

19 Claims, 11 Drawing Sheets

Related U.S. Application Data

(60) Provisional application No. 62/815,491, filed on Mar. 8, 2019.

(51) Int. Cl.
*B08B 3/02* (2006.01)
*B08B 1/00* (2006.01)
*A23N 12/02* (2006.01)
*B08B 3/04* (2006.01)

(56) References Cited

U.S. PATENT DOCUMENTS

| | | | |
|---|---|---|---|
| 5,419,353 A | 5/1995 | Chen | |
| 5,540,836 A | 7/1996 | Coyne | |
| 5,599,137 A | 2/1997 | Stephenson et al. | |
| 5,660,718 A | 8/1997 | Chudacek et al. | |
| 5,824,243 A | 10/1998 | Contreras | |
| 5,876,558 A | 3/1999 | Deng et al. | |
| 6,021,788 A | 2/2000 | King | |
| 6,082,548 A | 7/2000 | Stephenson et al. | |
| 6,848,455 B1 | 2/2005 | Shrinivasan et al. | |
| 7,244,401 B1 | 7/2007 | O'Ham | |
| 7,255,332 B2 | 8/2007 | Osborn et al. | |
| 7,278,434 B2 | 10/2007 | Huang | |
| 7,425,301 B2 | 9/2008 | Gillette et al. | |
| 7,628,912 B2 | 12/2009 | Yamasaki et al. | |
| 7,790,944 B2 | 9/2010 | O'Ham | |
| 7,803,272 B2 * | 9/2010 | Yamasaki | C02F 3/30 210/167.01 |
| 7,874,546 B2 | 1/2011 | Park | |
| 7,914,677 B2 | 3/2011 | Yamasaki et al. | |
| 7,955,631 B2 | 6/2011 | Turatti | |
| 8,016,041 B2 | 9/2011 | Kerfoot | |
| 8,137,703 B2 | 3/2012 | Chiba et al. | |
| 8,205,277 B2 * | 6/2012 | Yamasaki | A61H 33/6026 4/541.4 |
| 8,225,856 B2 | 7/2012 | Kerfoot | |
| 8,317,165 B2 * | 11/2012 | Yamasaki | B01F 23/231 261/26 |
| 8,573,303 B2 | 11/2013 | Kerfoot | |
| 8,735,337 B2 | 5/2014 | Lynn | |
| 8,906,241 B2 | 12/2014 | Kerfoot | |
| 9,044,794 B2 | 6/2015 | Holsteyns et al. | |
| 9,119,284 B2 | 8/2015 | Sanematsu | |
| 9,266,073 B2 | 2/2016 | Kerfoot | |
| 9,392,680 B2 | 7/2016 | Sanematsu et al. | |
| 9,586,186 B2 | 3/2017 | Roe | |
| 9,694,401 B2 | 7/2017 | Kerfoot | |
| 9,726,397 B1 | 8/2017 | Martin et al. | |
| 9,764,254 B2 * | 9/2017 | Kobayashi | B01F 23/29 |
| 9,845,253 B2 | 12/2017 | Miller et al. | |
| 10,080,998 B2 | 9/2018 | Roe et al. | |
| 10,259,730 B2 | 4/2019 | Ball et al. | |
| 10,293,309 B2 | 5/2019 | Tachibana et al. | |
| 10,315,202 B2 | 6/2019 | Baldauf et al. | |
| 10,351,451 B2 | 7/2019 | Takahashi | |
| 10,519,052 B2 | 12/2019 | Ball et al. | |
| 10,626,036 B1 | 4/2020 | Guoin | |
| 10,842,153 B2 | 11/2020 | Takahashi et al. | |
| 10,865,128 B2 | 12/2020 | Ball | |
| 10,874,996 B2 | 12/2020 | Tsuchiya et al. | |
| 10,875,803 B1 | 12/2020 | Guoin | |
| 2003/0230122 A1 | 12/2003 | Lee | |
| 2005/0279713 A1 | 12/2005 | Osborn et al. | |
| 2006/0016763 A1 | 1/2006 | Kerfoot | |
| 2006/0054205 A1 * | 3/2006 | Yabe | A61L 9/012 134/1 |
| 2007/0267334 A1 | 11/2007 | Osborn et al. | |
| 2007/0284316 A1 | 12/2007 | Yamasaki et al. | |
| 2008/0061006 A1 | 3/2008 | Kerfoot | |
| 2008/0237141 A1 | 10/2008 | Kerfoot | |
| 2009/0051057 A1 | 2/2009 | Kim et al. | |
| 2009/0201761 A1 | 8/2009 | Matsuno et al. | |
| 2009/0233839 A1 | 9/2009 | Lynn | |
| 2009/0272697 A1 | 11/2009 | Kerfoot | |
| 2009/0273103 A1 * | 11/2009 | Watanabe | B01F 25/4413 261/28 |
| 2010/0175181 A1 | 7/2010 | Chen | |
| 2010/0326912 A1 | 12/2010 | Noguchi et al. | |
| 2012/0085530 A1 | 4/2012 | Kerfoot | |
| 2012/0234772 A1 | 9/2012 | Cunningham et al. | |
| 2012/0279925 A1 | 11/2012 | Miller et al. | |
| 2013/0062060 A1 | 3/2013 | Kerfoot | |
| 2013/0098753 A1 | 4/2013 | Sanematsu et al. | |
| 2013/0291316 A1 | 11/2013 | Kim et al. | |
| 2013/0291794 A1 | 11/2013 | Sanematsu et al. | |
| 2013/0315627 A1 * | 11/2013 | Sugiyama | B08B 3/102 399/237 |
| 2013/0334955 A1 | 12/2013 | Saitoh et al. | |
| 2014/0144844 A1 | 5/2014 | Miller et al. | |
| 2014/0202965 A1 | 7/2014 | Honda et al. | |
| 2014/0246366 A1 | 9/2014 | Kerfoot | |
| 2015/0123295 A1 | 5/2015 | Kerfoot | |
| 2015/0151993 A1 | 6/2015 | Kerfoot | |
| 2015/0176170 A1 | 6/2015 | Bae et al. | |
| 2015/0176171 A1 | 6/2015 | Kim | |
| 2015/0274557 A1 | 10/2015 | Watson et al. | |
| 2015/0313435 A1 * | 11/2015 | Citsay | A47L 11/405 134/6 |
| 2015/0368137 A1 | 12/2015 | Miller et al. | |
| 2016/0066760 A1 * | 3/2016 | Citsay | B08B 3/10 205/628 |
| 2016/0221848 A1 | 8/2016 | Miller et al. | |
| 2016/0228834 A1 | 8/2016 | Roe | |
| 2016/0243508 A1 | 8/2016 | Jung et al. | |
| 2016/0325247 A1 | 11/2016 | Roe | |
| 2017/0128895 A1 | 5/2017 | Roe et al. | |
| 2017/0210649 A1 | 7/2017 | Takahashi | |
| 2017/0210650 A1 | 7/2017 | Takahashi | |
| 2017/0215428 A1 | 8/2017 | Takahashi et al. | |
| 2017/0216794 A1 * | 8/2017 | Kamimura | B01F 35/221 |
| 2017/0259218 A1 * | 9/2017 | Lin | B01F 23/23 |
| 2017/0348743 A1 | 12/2017 | Kerfoot | |
| 2018/0134994 A1 | 5/2018 | Steele et al. | |
| 2018/0178173 A1 * | 6/2018 | Nakao | B01F 25/4341 |
| 2018/0258100 A1 | 9/2018 | Gregory et al. | |
| 2018/0319685 A1 | 11/2018 | Ball et al. | |
| 2018/0332787 A1 | 11/2018 | Leo | |
| 2019/0060223 A1 * | 2/2019 | Yaniv | B01F 23/23121 |
| 2019/0210900 A1 | 7/2019 | Ball et al. | |
| 2019/0241452 A1 | 8/2019 | Ball | |
| 2019/0248689 A1 | 8/2019 | Miller et al. | |
| 2019/0381466 A1 | 12/2019 | Cho | |
| 2020/0148565 A1 | 5/2020 | Ball et al. | |
| 2020/0164413 A1 * | 5/2020 | Iai | C11D 7/02 |
| 2020/0238230 A1 | 7/2020 | Fujita et al. | |
| 2020/0254468 A1 | 8/2020 | Kubota et al. | |
| 2020/0276515 A1 | 9/2020 | Kubota et al. | |
| 2020/0308032 A1 | 10/2020 | Domrese et al. | |
| 2021/0001287 A1 | 1/2021 | Kim | |
| 2021/0024387 A1 | 1/2021 | Miller et al. | |
| 2021/0030007 A1 | 2/2021 | Takahashi et al. | |
| 2022/0331750 A1 * | 10/2022 | Athey | B01F 23/2323 |

FOREIGN PATENT DOCUMENTS

| | | |
|---|---|---|
| CN | 104287063 A | 1/2015 |
| CN | 204207049 U | 3/2015 |
| CN | 104475393 A | 4/2015 |
| CN | 104351922 B | 6/2016 |
| CN | 206674965 U | 11/2017 |
| CN | 207544970 U | 6/2018 |

(56) References Cited

FOREIGN PATENT DOCUMENTS

| CN | 108325402 A | | 7/2018 |
|----|----|----|----|
| EP | 3144962 A1 | | 3/2017 |
| KR | 20110130283 A | * | 12/2011 |
| KR | 20130003277 A | * | 1/2013 |
| WO | WO 2004/030837 A1 | * | 4/2004 |
| WO | WO 2016/006636 A1 | * | 1/2016 |

OTHER PUBLICATIONS

International Search Report issued in PCT Patent Application No. PCT/US2020/021773 dated Jun. 12, 2020.
Written Opinion of the International Searching Authority issued in PCT Patent Application No. PCT/US2020/021773 dated Jun. 12, 2020.

* cited by examiner

SYSTEMS AND METHODS OF CONTROLLING A CONCENTRATION OF MICROBUBBLES AND NANOBUBBLES OF A SOLUTION FOR TREATMENT OF A PRODUCT

FIELD

The present application is a National Stage application of and claims priority to Patent Cooperation Treaty (PCT) Application No. PCT/US20/21773 filed on Mar. 9, 2020 and entitled "Systems and Methods of Controlling a Concentration of Microbubbles and Nanobubbles of a Solution for Treatment of a Product," and is a continuation in part of and claims priority to U.S. patent application Ser. No. 16/706,779 filed on Dec. 8, 2019 and entitled "Systems and Methods of Controlling a Concentration of Microbubbles and Nanobubbles of a Solution for Treatment of a Product", now abandoned, which is a non-provisional of and claims priority to U.S. Provisional Patent Application No. 62/815,491 filed on Mar. 8, 2019 and entitled "Methods and Systems for Cleaning by Selective Use of Microbubbles and Nanobubbles", all of which are incorporated herein by reference in their entireties.

GOVERNMENT LICENSE RIGHTS

This invention was made with Government support under grant number 1R43FD006465-01 awarded by the Food and Drug Administration and under grant number 2019-33610-29764 awarded by the United States Department of Agriculture. The Government has certain rights in the invention.

FIELD

The present disclosure is generally related to systems and methods for cleaning selected items by selective use of microbubbles, nanobubbles, or any combination thereof. More particularly, the present disclosure relates to systems and methods of cleaning one or more items by controlling a gas composition and ratio of microbubbles to nanobubbles in a solution. The solution may be used to, for example, clean various food products, such as fruits and vegetables, to treat water or waste via floatation and settling separation processes, to deliver nutrients in aerobic and anaerobic processes, and so on.

BACKGROUND

Conventionally, washing or sterilizing items may leave residual detergents, chemicals, or other residual contaminants, which may contaminate an object during the cleaning process. Such residual contaminants may be undesirable in a variety of contexts, including food processing and so on.

SUMMARY

In some embodiments, systems and methods are described below that may be configured to control a ratio of nanobubbles to microbubbles in a solution to provide a selected effect, such as cleaning, delivering nutrients, providing a protective film, providing other effects, or any combination thereof. Additionally, the systems and methods may include controlling a gas composition of the microbubbles, the nanobubbles, or both to provide the selected effect. In some implementations, a system may include controlling both a ratio of the nanobubbles to the microbubbles and the ratio of bubbles of one chemical composition to bubbles of another chemical composition. Other implementations are also possible.

In some embodiments, a system may include a circulation subsystem and a circuit coupled to the circulation subsystem. The circuit may provide one or more signals to control the circulation subsystem to circulate a treatment solution including one or more of microbubbles or nanobubbles in a selected ratio. In one aspect, the nanobubbles may include a first gas, and the microbubbles may include a second gas. In another aspect, the treatment solution may include a first percentage of nanobubbles and a second percentage of microbubbles.

In other embodiments, a method of treating an object with a treatment solution may include infusing one or more gases into a liquid to form a solution including microbubbles and nanobubbles and separating the solution into a first solution including predominately microbubbles and a second solution including predominately nanobubbles. For example, the first solution may be a solution matrix comprised exclusively of nanobubbles. The second solution may be a solution matrix comprised of microbubbles. In some implementations, the solution matrices may also be comprised of dissolved gases or entrained gases. The method may further include determining a selected ratio of the second solution to the first solution to produce a treatment solution and providing the treatment solution to one or more nozzles to apply the treatment solution to the object.

In still other embodiments, a system includes a gas handling subsystem, a microbubble and nanobubble generator, a nanobubble isolation system, and a circuit. The gas handling subsystem may provide one or more gases. The microbubble and nanobubble generator may infuse a liquid with the one or more gases to produce a solution. A bubble separator system may produce a first solution including predominately microbubbles and a second solution including predominately nanobubbles. The circuit may be coupled to the bubble separator system and may provide one or more signals to control the bubble separator system to produce a treatment solution including a first amount of the first solution and a second amount of the second solution. The treatment solution may include a first percentage of microbubbles and a second percentage of nanobubbles. In some implementations, the first and second solutions may be blended within a larger treatment tank. In some implementations, the solution may be applied to an object and washed with mechanical agitation.

In some embodiments, a system may selectively deliver a solution matrix to a product, such as produce or other items, for a selected purpose. The solution matrix may include one or more of a first solution matrix including microbubbles, a second solution matrix including nanobubbles, and a third solution matrix including dissolved gases according to selected ratios.

BRIEF DESCRIPTION OF THE DRAWINGS

The detailed description is set forth with reference to the accompanying figures. In the figures, the left most digit(s) of a reference number identifies the figure in which the reference number first appears. The use of the same reference numbers in different figures indicates similar or identical items or features.

Figure 1:
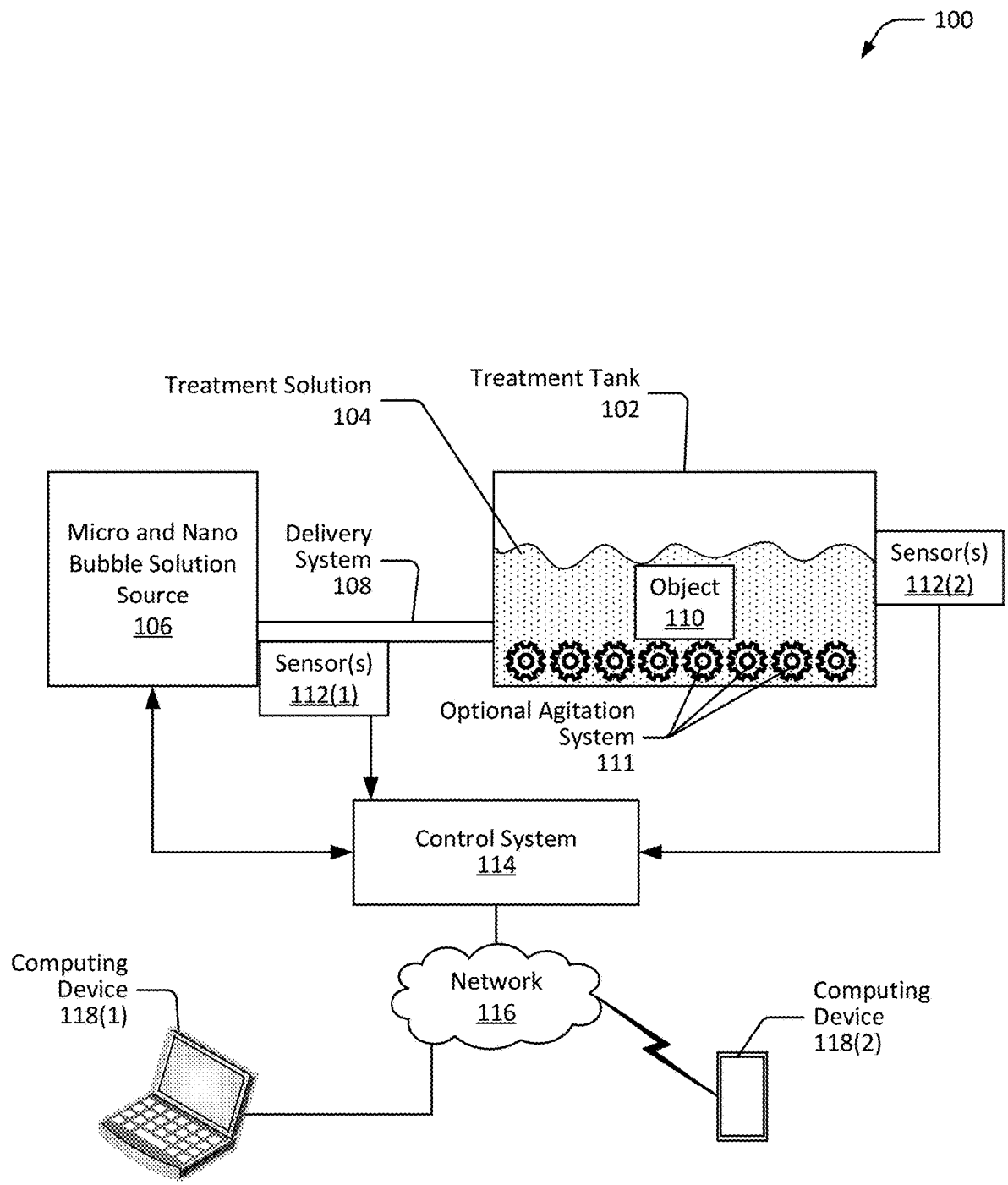
FIG. 1 depicts a diagram of a system to provide a selected treatment solution, in accordance with certain embodiments of the present disclosure.

While implementations are described in this disclosure by way of example, those skilled in the art will recognize that the implementations are not limited to the examples or figures described. It should be understood that the figures and detailed description thereto are not intended to limit implementations to the form disclosed, but on the contrary, the intention is to cover all modifications, equivalents, and alternatives falling within the spirit and scope as defined by the appended claims. The headings used in this disclosure are for organizational purposes only and are not meant to limit the scope of the description or the claims. As used throughout this application, the word "may" is used in a permissive sense (in other words, the term "may" is intended to mean "having the potential to") instead of in a mandatory sense (as in "must"). Similarly, the terms "include", "including", and "includes" mean "including, but not limited to".

DETAILED DESCRIPTION OF ILLUSTRATIVE EMBODIMENTS

There are many existing functional reasons why certain gases and/or bubbles might be infused into a liquid, including to aid in processing of the liquid mixtures (such as in treating wastewater) or, separately, to utilize the liquid to help process solids (such as in washing food products). Traditionally, two options have been available to charge a gas into a liquid: (i) dissolving the gas within the liquid, which is limited by the solubility limits of the gas and the liquid; and (ii) injecting bubbles into the liquid, which has been limited by the resident time of a bubble in the liquid, as determined by the buoyancy of such bubbles. Unfortunately, neither of these methods has been very efficient, as bubble processes result in outgassing (the gas being released from the liquid), and dissolved gas is limited in concentration and has a depth dependency, resulting in uneven application.

Nanobubbles have been shown to stay resident in a solution for long periods of time (from days to months) due to their buoyancy force being lower than their thermal motion. The term "nanobubble" refers to a bubble formed of a selected gas and having a size that is approximately 1 micrometer or less in diameter. Nanobubbles with a diameter of 50 nanometers (nm) to about 100 nm may have a pressure of tens of atmospheres due to the surface tension within water. Calculation results for nanometer ozone bubbles indicate that hydrogen bonds of the water interact with one another and the probability of hydrogen atoms existing within each nanobubble is large. Mutual action of the nanobubbles may indicate that charge separation similar to soap can be realized at the air-liquid interface due to the size of the bubble, promoting both cleaning effects and electrostatic sterilizing effects.

In some implementations, the tension and surface activity of nanobubbles may be greater than bubbles having a larger diameter, particularly when the nanobubbles are introduced at a reduced temperature sufficient to compress the gas. Since the surface activity is high, the nanobubbles may absorb contaminants at the interface, removing the contaminants from the object or the solution. In some instances, nanobubbles show a relatively high-affinity fine-particle binding in connection with cleaning processes, providing a removal or cleaning affect. In some implementations, surfactants in conjunction with nanobubbles may reduce interfacial tension within the solution.

Additionally, nanobubbles enable hyper saturation of a solution beyond traditional solubility limits, which allows for extended ranges of concentrations of chemical and gas compositions. At reduced temperatures, the nanobubbles may be formed from compressed gas, enhancing the concentration of the gas in the nanobubbles and within the solution as the nanobubbles collapse and diffuse over time. Additionally, the nanobubbles may maintain selected gas compositions within the solution for extended periods through time-rate reduction of out-gassing.

Embodiments of systems and methods described below may be used to produce a treatment solution infused with bubbles of one or more selected gas compositions and optionally with a selected concentration of microbubbles (bubbles of a selected gas with a diameter between approximately 10 and 100 micrometers), nanobubbles (with a diameter of approximately 1 micrometer or less), dissolved gas, or any combination thereof. In one implementation, the systems may produce a treatment solution (e.g., a solution matrix) comprising a liquid infused predominately with microbubbles. The microbubble solution may include a higher concentration of dissolved gas as the microbubbles may break down faster than nanobubbles of similar chemical composition. In some implementations, the microbubble solution may provide a treatment time that may be shorter than that of a solution matrix consisting of a nanobubble solution because of the faster breakdown time of the chemical microbubbles in the solution. Additionally, the microbubbles within the solution may demonstrate greater movement than nanobubbles, which may aid in dislodging particles or other contaminants.

In other implementations, the system may produce a treatment solution (e.g., a solution matrix) infused with a mixture of mixture of microbubbles and nanobubbles. The ratio of the nanobubbles and the microbubbles may be controlled to provide a selected bubble concentration. In this example, the microbubbles may breakdown faster and move more than the nanobubbles within the solution, and the nanobubbles may collapse or diffuse more slowly over time than the microbubbles, providing a time-release effect. The resulting solution may provide a selected combination of cleaning and decontamination.

In some implementations, the timing and location of the introduction of the solution matrices (a first solution matrix of liquid-infused with microbubbles and nanobubbles, a second solution matrix of liquid-infused with nanobubbles, a third solution matrix of liquid-infused with dissolved gas, or any combination thereof) may be varied to enhance a cleaning effect. For example, in a treatment tank, the first solution of microbubbles may be introduced at a bottom portion of the tank so that the microbubbles can rise from the bottom of the treatment tank, through and around an object being treated, and to the top of the treatment tank. The second solution of nanobubbles may be introduced along the sides and near a top of the treatment tank, and the nanobubbles may diffuse throughout the treatment tank. Since nanobubbles tend to distribute throughout the treatment solution, the nanobubbles may be introduced at or near a top portion of the treatment tank.

Further, in some implementations, a product may be exposed to a second solution matrix comprised primarily of nanobubbles in a first portion of a treatment process. The product may be exposed to one or more of a first solution matrix comprised primarily of microbubbles or the second solution matrix in a second portion of the treatment process. In some implementations, in a third portion of the treatment tank, the first solution matrix of microbubbles may be introduced and directed to separate contaminants from the treatment solution, such as by bubbling the contaminated or fouled treatment solution to a top of the solution within the treatment tank, where the contaminated or fouled treatment solution may be filtered or skimmed from at or near the surface of the treatment solution. In some implementations, a mechanical scrubbing through the use of brushes may be combined with the primary or secondary solution matrix to aid in the cleaning of the object.

In some implementations, the second solution of nanobubbles may maintain a stream or jet for a first distance within the treatment tank before spreading out and creating turbulence. The third solution of dissolved gas may be included with the first solution or the second solution or both, or may be introduced separately. In some instances, the turbulence from the stream or jet of the second solution of nanobubbles and additional turbulence from the bubbling of the microbubbles may cooperate to provide a selected treatment.

In an example, the nanobubbles may facilitate dislodging of contaminants from the surface of a product. The microbubbles may also facilitate dislodging of the contaminants and aid in floating such particulates to the surface for removal. For example, the microbubbles may operate within the treatment solution to remove dirt from freshly harvested produce. Other implementations are also possible.

In another implementation, the system may produce a treatment solution that includes a liquid infused predominately with nanobubbles. The nanobubbles may remain in solution for an extended period, enabling a treatment bath that may clean or decontaminate a product over a period of time. In some instances, the nanobubbles may collapse or diffuse over time, providing a time-release chemical treatment for the product. Other implementations are also possible.

In still another implementation, the system may produce a treatment solution that includes a liquid containing dissolved gas. The dissolved gas may provide faster reaction time for killing certain bacteria and may operate to change the pH of the treatment solution but may not provide the same particulate cleaning operation as the bubble infused solutions. The system may combine the liquid infused with the dissolved gas with one or more solution matrices including microbubbles, nanobubbles, or both.

In some implementation, the dissolved gas solution, the microbubble solution, the microbubble-nanobubble mixture solution, or the nanobubble solution may be used to treat various products and surfaces. The selected solution may be applied to a product via application as a spray to the surface of the product, via infusion into a treatment container including water in which the product is immersed, or a combination thereof. The infusion of the dissolved gas, the microbubbles, the nanobubbles, the microbubble-nanobubble mixture, or any combination thereof may be used to destroy and remove bacteria, viruses, and other harmful pathogens from the surface of the product. In some instances, the treatment may include a solution matrix to promote ripening, to extend the shelf life, or to provide a protective coating. Other implementations are also possible.

In some implementations, the dissolved gas solution, the microbubble solution, the microbubble-nanobubble mixture solution, the nanobubble solution, or any combination thereof may provide aeration to promote aerobic processes; change the pH of the treatment solution; and so on. In the case of certain food products, the treatment solution may be selected to prolong the shelf-life or advance the ripening rate of such food product.

In some implementations, one or more solution matrices may be used to dislodge certain particulates from the surface of a product and to float such particulates to the surface (for example, removing dirt from a head of lettuce). In some implementations, the sizes of the bubbles may be controlled to facilitate the floating of such particulates to the surface, to control timing of the chemical concentration of the treatment solution, and so on. Additionally, in some implementations, the angle of the nozzles to introduce the solution into a treatment bath may be controlled to provide a selected particulate removal affect.

Specific gases may be selected for infusion into liquid to achieve the desired physiochemical effects. For example, carbon dioxide gas may be injected to increase the acidity of a liquid. In another example, nitrogen gas may be injected to act as a surfactant for the liquid. In still another example, nitrogen gas, ethylene gas, or a combination thereof may be injected to promote ripening in certain food products. In another example, the solution may be varied over time to provide selected affects. Such gases may be dissolved directly into the treatment solution or may be injected into the treatment solution in the form of microbubbles, nanobubbles, or both. In some implementations, such as when it may be desirable to limit the venting of the gas to atmosphere, the solution matrix that is introduced may be primarily comprised of nanobubbles, which remain in solution for a longer period of time than larger bubbles. Other implementations are also possible.

In some implementations, the systems may include sensors and a processor coupled to the sensors and to one or more system components to provide a fully automated system. The automated system may be configured to adjust gas concentrations, bubble sizes, or both to enable efficient automatic deployment of gas resources and liquid flow to implement effective treatment of a product. In some implementations, the treatment may include cleaning a product, prolonging the shelf-life of the product, ripening the product, or any combination thereof.

FIG. 1 depicts a diagram of a system 100 to provide a selected treatment solution, in accordance with certain embodiments of the present disclosure. The system 100 may include a treatment tank 102 including a treatment solution 104. In this example, the treatment solution 104 is depicted as a solution bath in which an object 110 (such as a food product, a device, or another item) is immersed. However, it should be appreciated that the treatment tank 102 may include one or more sprayers or spray nozzles to dispense a solution onto the object 110 within the treatment tank. Additionally or in lieu of the sprayers or spray nozzles, the treatment tank 102 may include an agitation system 111, which may include one or more rotating brushes or other mechanical elements to facilitate washing of the object 110. In some implementations, the treatment tank 102 may include a plurality of nozzles to direct the solution toward the object 110, whether the object 110 is completely immersed or partially immersed in the treatment solution 104, or the object is simply placed within the treatment tank 102 or on a surface.

The treatment tank 102 may be coupled to a microbubble and nanobubble solution source 106 via a delivery system 108. In an example, the microbubble and nanobubble solution source 106 may be configured to generate a first solution matrix comprised of microbubbles and possibly nanobubbles, a second solution matrix comprised of nanobubbles, a third solution matrix comprised of a mixture of microbubbles and nanobubbles in a selected ratio, a fourth solution matrix comprised of a liquid infused with a dissolved gas, or any combination thereof. The delivery system 108 may include one or more valves to direct flow of the solution from the source 106 to the treatment tank 102 and back to the source 106.

The system 100 may further include one or more sensors 112. The sensors 112 may include first sensors 112(1) coupled to the source 106, to the delivery system 108, or any combination thereof. The sensors 112 may also include second sensors 112(2) coupled to the treatment tank 102. The sensors 112 may be configured to determine one or more parameters, including temperature, concentration of chemicals, concentration of bubbles, bubble sizes, and so on. In some implementations, the sensors 112 may also be configured to detect contaminants associated with the object 110 and to provide the information to a control system 114.

The control system 114 may be implemented as a circuit, a computing device, or any combination thereof. The control system 114 may be configured to communicate with the one or more sensors 112, with one or more actuatable valves, and with one or more computing devices 118 via a network 116. The network 116 may include one or more networks. In an example, the network 116 may represent an Internet connection as well as local area networks. In some implementations, the control system 114 may selectively control one or more valves or other actuatable components associated with one or more of the source 106, the delivery system 108, and the treatment tank 102 to achieve a selected affect.

The computing devices 118 may be configured to receive data from the control system 114 and to provide instructions to adjust operation of the control system 114. In some implementations, the control system 114 may receive software upgrades and parameter adjustments from one of the computing devices 118, which may be associated with an authorized user. In other implementations, such changes may be implemented via one or more input/output interfaces of the control system 114. Other implementations are also possible.

The control system 114 may be configured to control the source 106, the delivery system 108, or both to provide a selected solution. For example, the control system 114 may control one or more of the source 106 or the delivery system 108 to provide a treatment solution 104 having a selected composition of dissolved gas, nanobubbles, microbubbles, or any combination thereof. Additionally, the control system 114 may control one or more of the source 106 or the delivery system 108 to determine a chemical composition of the dissolved gas, the nanobubbles, the microbubbles, the treatment solution 104, or any combination thereof. In some implementations, the control system 114 may also control a ratio of nanobubbles to microbubbles within the solution as well as the relative concentrations of different gases within the microbubbles and the nanobubbles. Other implementations are also possible.

The system 100 may be implemented in a variety of different ways, enabling adjustment of the chemical composition, the composition of the treatment fluid 104 (in terms of bubbles, chemical composition, or both), the fluid flow rates, the fluid turbulence, and so on. An example of an overview of the system 100 is described below with respect to FIG. 2.

Figure 2:
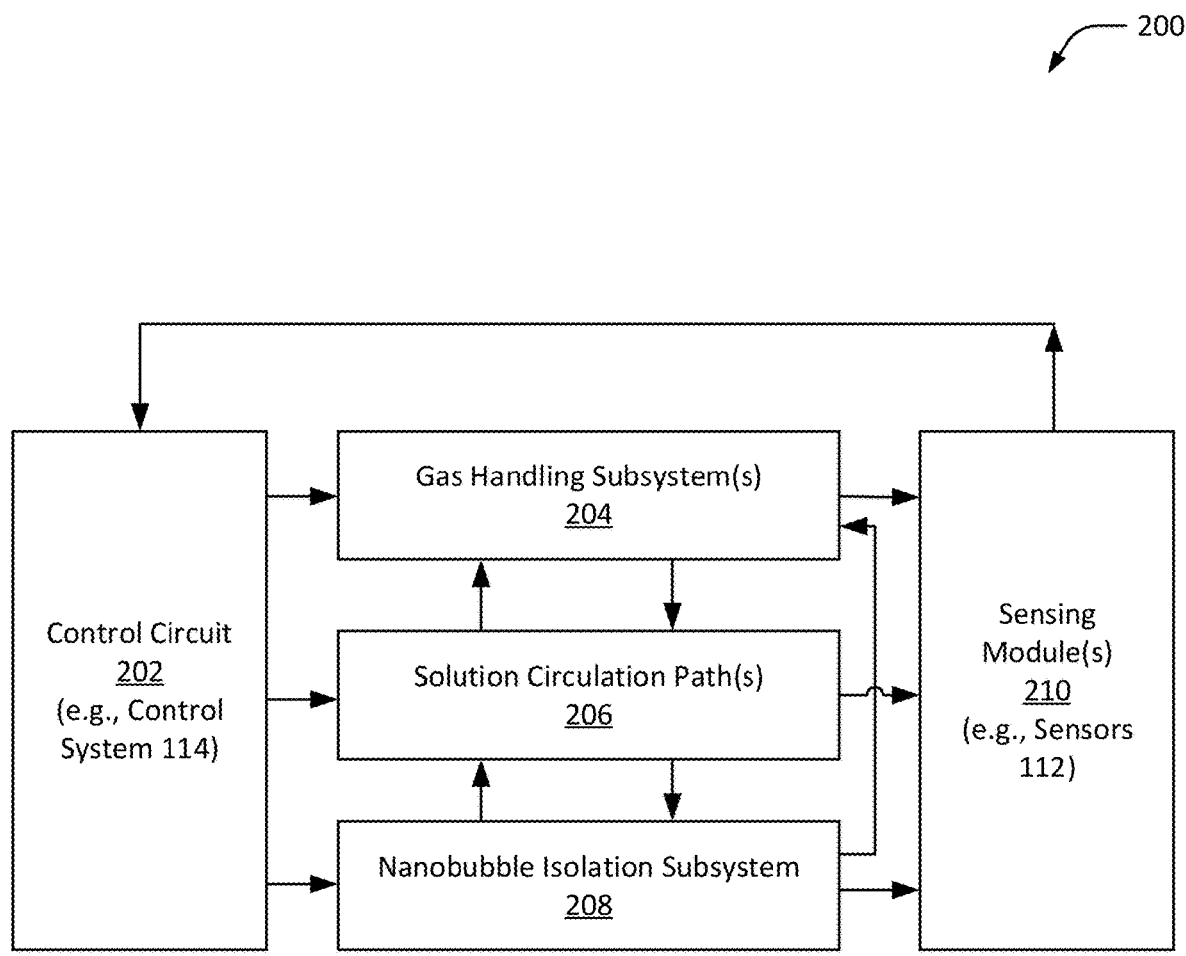
FIG. 2 depicts a block diagram of a system to provide a selected treatment solution, in accordance with certain embodiments of the present disclosure.

FIG. 2 depicts a block diagram of a system 200 to provide a selected treatment solution, in accordance with certain embodiments of the present disclosure. The system 200 may represent an implementation of the system 100 of FIG. 1, with some of the elements omitted from the drawing for ease of discussion.

The system 200 may include a control circuit 202, which may be an implementation of the control system 114 of FIG. 1. The system 200 may include one or more gas handling subsystems 204, one or more fluid circulation paths 206, a nanobubble isolation subsystem 208, and one or more sensing modules 210, which may be embodiments of the sensors 112 in FIG. 1. The gas handling subsystems 204 may include gas canisters or sources, valves, conduits, and bubble formation components for producing nanobubbles and microbubbles. The gas handling subsystems 204 may be responsive to signals from the control circuit 202 to produce a selected concentration and type of bubbles.

The solution circulation paths 206 may include conduits and valves to direct fluid flow from the gas handling subsystems 204 to one or more other components, such as storage tanks, treatment tank 102, nozzles, sprayers, and so on. The solution circulation paths 206 may include components, such as actuatable valves, which may be responsive to signals from the control circuit 202 to open and close to direct fluid flow.

The nanobubble isolation subsystem 208 may be configured to produce bubbles. In some implementations, the nanobubble isolation subsystem 208 may isolate nanobubbles from other bubbles, including microbubbles and macro-bubbles, to provide a volume of solution including nanobubbles. The nanobubble isolation subsystem 208 may include bubble generators as well as actuatable valves responsive to signals from the control circuit 202 to control production of nanobubbles.

In the illustrated example, the control circuit 202 may be coupled to the one or more gas handling subsystems 204, to the one or more fluid circulation paths 206, and to the nanobubble isolation subsystem 208. The nanobubble isolation subsystem 208 may be coupled to the gas handling subsystems 204 to deliver a solution matrix comprised of nanobubbles. The sensing modules 210 may be coupled to each of the one or more gas handling subsystems 204, the one or more fluid circulation paths 206, and the nanobubble isolation subsystem 208. The sensing modules 210 may be configured to determine one or more parameters associated with the various subsystems and paths and to provide data related to the sensed parameters to the control circuit 202.

In some implementations, the production of a first solution comprised of microbubbles (and some nanobubbles) and a second solution comprised of nanobubbles can be regulated by the control circuit 202. Further, the control circuit 202 may control a mixture of the first solution of microbubbles and the second solution of nanobubbles based on input gathered by one or more sensors 112. The control circuit 202 may include a plurality of closed-loop control routines that may allow, for example, setpoint targets to be achieved and held at desired levels while counteracting disturbances such as variations in ambient temperature, feedstock or organic load. The control circuit 202 may be manually tuned or self-adapting to enable automated control of the system 200 during normal operation. In some implementations, the control circuit 202 may control the ratios of the first solution and the second solution, the timing of the application of the first solution and the second solution, and so on.

The system 200 may include a plurality of components, some of which may be controlled by the control circuit 202. An example of an implementation of the system 200 is described below with respect to FIG. 3.

Figure 3:
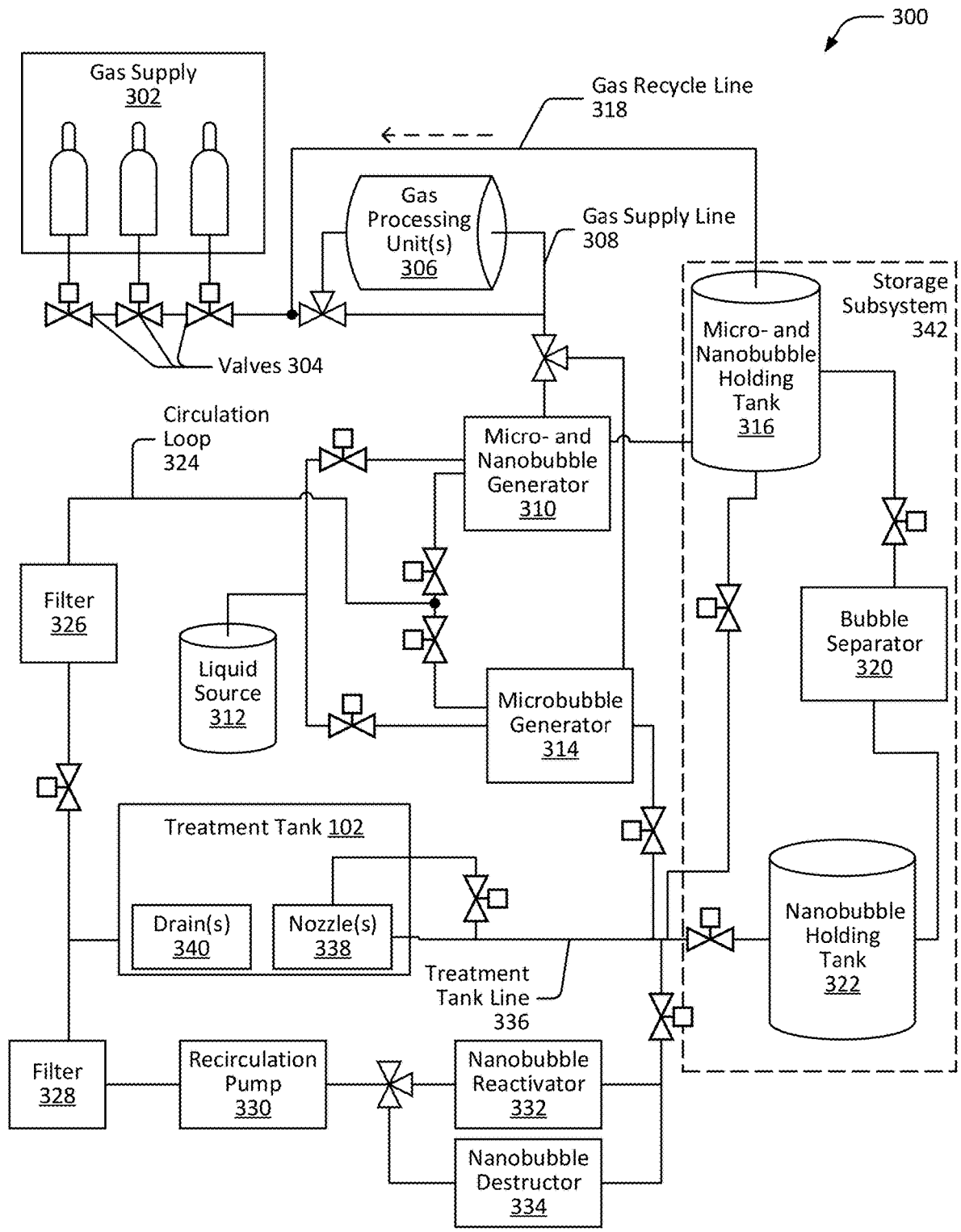
FIG. 3 depicts a diagram of a system to provide a selected treatment solution, in accordance with certain embodiments of the present disclosure.

FIG. 3 depicts a diagram of a system 300 to provide a selected treatment solution, in accordance with certain embodiments of the present disclosure. The system 300 may be an implementation of the systems 100 and 200 of FIGS. 1 and 2.

The system 300 may include a gas supply 302, which may include a plurality of gas canisters, another gas source, or any combination thereof. The gas supply 302 may provide selected gases, such as carbon dioxide, nitrogen, and so on. The gas supply 302 may include primary source gases that can be contained gas canisters at high pressure, extracted from the air by using a concentrator to separate air into its components (oxygen, nitrogen, and so on), or any combination thereof. Specific gases can be selected for infusion into liquid to provide a solution matrix having certain physiochemical effects. For example, carbon dioxide can act as an acid. Nitrogen gas may act as a surfactant for the liquid. Ethylene gas can act as a ripening agent for certain food products. Other gases or gas compositions may also be used.

The gas supply 302 may be coupled to one or more gas processing units 306 by one or more valves 304. In the illustrated example, the gas supply 302 may be coupled to the gas processing unit 306 by a valve 304. The gas processing unit 306 may include a thermal unit to adjust a temperature of the gas, an ozone generator, other components, or any combination thereof. The gas processing unit 306 may be configured to alter certain gas properties. In an example, the gas processing unit can ionize molecular gaseous oxygen to result in a proportional recombination of ozone or can be used to cool or heat a gas to modify its density prior to injection.

The system 300 may further include a microbubble and nanobubble generator 310 coupled to the gas processing unit 306 by a gas supply line 308 and a valve. The system 300 may also include a microbubble generator 314 by the gas supply line 308 and the valve. A liquid source 312 may provide a selected liquid to the microbubble and nanobubble generator 312 and to the microbubble generator 314 by valves. The microbubble and nanobubble generator 310 may include an input coupled to a filter 326 via a circulation loop 324 and a valve and may include an output coupled to a microbubble and nanobubble holding tank 316. The microbubble generator includes an input coupled to the filter 326 via the circulation loop 324 and includes an output coupled to the treatment tank 102 through a treatment tank line 336 and a valve.

The system 300 also includes a nanobubble holding tank 322 that is coupled to the microbubble and nanobubble holding tank 316 by a bubble separator 320 and a valve. The bubble separator 320 may remove microbubbles from the solution and may provide the resulting filtered nanobubble solution to the nanobubble holding tank 322. The nanobubble holding tank 322 is also coupled to the treatment tank line 336 by a valve. The microbubble and nanobubble holding tank 316, the bubble separator 320, and the nanobubble holding tank 322, as well as associated valves and lines, may be part of a storage subsystem 342, which may store the solution matrices prior to use.

The treatment tank 102 may include one or more nozzles to direct a selected solution within the treatment tank 102. The nozzles 338 may include (in air or underwater) sprayers, turbulence generators, and other fluid flow components to produce a desired flow and application of the solution. The treatment tank 102 may also include one or more drains 340 or filters to drain the solution and optionally to filter particulates. Other implementations are also possible.

The system 300 may also include a valve to couple the treatment tank line 336 to a nanobubble reactivator 332 and a nanobubble destructor 334. The nanobubble reactivator 332 may be configured to deliver electromagnetic energy to gas within the solution and by changing the constituent form of such gas. In one example, the nanobubble reactivator 332 may be configured to ionize molecular oxygen (or other gases) to allow for recombination to ozone. The nanobubble destructor 334 may be configured to destroy nanobubbles prior to disposal of the solution via the drain 340. For example, if disposal procedures or regulations prevent direct disposal of the solution through the drain 340, the nanobubble destructor 334 may be activated to destroy the nanobubbles prior to disposal. In some implementations, the nanobubble destructor 334 may destroy bubbles, for example, by returning a liquid mixture to a vapor state and depressurizing.

The system 300 may also include a recirculation pump 330 to receive fluid from the nanobubble reactivator 332 or the nanobubble destructor 334 and to provide the fluid to the microbubble and nanobubble generator 310 and the microbubble generator 314 through filters 328 and 326, the circulation loop 324, and valves.

In some implementations, the control system 114 (or control circuit 202) may be coupled to each of the valves 304 and the other valves to control fluid flow throughout the system 300. Further, in some implementations, one or more actuators may be included that may be responsive to signals from the control system 114 (or control circuit 202) to adjust fluid flow, to adjust a delivery angle, and so on. Other implementations are also possible.

In an example, the control system 114 (or control circuit 202) may control the valves 304 to provide a selected gas from one or more canisters of the gas supply 302. The gas processing units 306 may be configured to deliver the selected gas via the gas supply line 308 to the generators 310 and 314, which may produce a microbubble and nanobubble solution, which may be provided to the microbubble and nanobubble holding tank 316. Nanobubbles may be extracted from the mixture using the bubble separator 320, and the resulting nanobubble solution may be provided to the nanobubble holding tank 322.

The control system 114 (or control circuit 202) may selectively control the gas supply 302, the generators 310 and 314, and the holding tanks 316 and 322 to provide a solution having one or more of a selected chemical composition, a selected ratio of nanobubbles to microbubbles, and so on. The system 300 may provide solutions of gas-infused liquids (including bubbles of selected size) having a selected chemical composition to provide a treatment solution in the form of a wash or spray.

In some implementations, sensors 112 may be distributed throughout the system 300 to determine parameters at various points. In one example, the sensors 112 may determine selected parameters, which may be used by the control system 114 (or the control circuit 202) to manage operation of the various components to provide a selected treatment of a product. It should be appreciated that the solution may include a plurality of gases, which may be infused within the solution in different forms (e.g., dissolved gas, microbubbles, nanobubbles, or any combination thereof). In one example, a first solution matrix may be comprised of microbubbles, a second solution matrix comprised of nanobubbles, a third solution matrix infused with dissolved gas, or any combination thereof. The control system 114 (or control circuit 202) may control the various components to provide the second solution matrix of nanobubbles having selected concentrations of the first gas and the second gas, the first solution matrix comprised of microbubbles having selected concentrations of the first gas and the second gas, the third solution matrix having selected concentrations of dissolved gas, or any combination thereof.

The circulation loop 324 may operate to inject gases into a liquid and to control such gas/liquid mixtures to benefit cleaning processes, such as those using nozzles 338, which may be submerged in a treatment solution 104 within the treatment tank 102 or which may spray the solution onto the object. One or more gases from the gas handling subsystem 402 may be provided to the microbubble generator 314 and to the microbubble and nanobubble generator 310.

In some implementations, the microbubble generator 314 may include a pump with controlled cavitation device or a simple gas mixture device such as a venturi valve. Other microbubble generation devices are also possible.

The microbubble and nanobubble generator 310 may include a pump capable of producing microbubbles and nanobubbles or just nanobubbles through cavitation, a device to provide injection of gas into a shear flow of liquid, a device to manage high pressure saturation and subsequent pressure drops, an electrolysis device, or any combination thereof.

The liquid source 312 may provide a fluid to both the microbubble generator 314 and the microbubble and nanobubble generator 310. The generators 310 and 314 may combine the fluid and the gas to produce a solution that includes microbubbles and nanobubbles. The solution may be fed from internal sources, external sources, or both, including a return line from treatment tank 102 or an external water source such as municipal or well water. The filters 328 and 326 may remove solid wastes before recirculation.

The valves may be used to introduce to the circulation loop 324 portions of a solution including dissolved gas, macro-bubbles, nanobubbles, or any combination thereof. Such portions may be determined based on the intended application. For example, a portion containing predominately nanobubbles filled with ozone gas may be used to sanitize wash water. Or for example, carbon dioxide can be used to lower the pH of a solution by a selected amount. The nanobubbles may result in minimal outgassing to mitigate environmental hazards while retaining more of the gas in solution. Further, certain gases in the nanobubble form may decay slower than others. As an additional example, microbubbles can be used to aid agitation and dislodgement of inorganic residue in separation processes of floatation and settling. Cleaning of products and liquid streams can occur through interfaces such as the treatment tank 102 with nozzles 338 (submerged, spray, or both). In an example, the solution may be sprayed via nozzles 338 directly onto objects 110, such as post-harvested food.

The treatment tank line 336 fed from the treatment tank 104 may interact with the gas-infused solution to remove or recharge the gas bubbles or the liquid. A drain 340 may dispose of liquids and may be opened and closed based on signals from the control system 114 (or control circuit 202), allowing for controlled discharge at selected times, such as at the end of a work cycle or when the sensors 112 indicate that the treatment solution 104 contains too many containments to support further washing.

The recirculation pump 330 may be used to circulate the solution from the treatment tank 104, by drawing the solution through the filter 328 and feeding a nanobubble reactivator 332 or a nanobubble destructor 334. The solution may be returned to the treatment tank 102 by a treatment tank line 336. The nanobubble reactivator 332 may produce results similar to the gas processing unit 306 by imparting electromagnetic energy to gas and changing the constituent form of such gas, such as, without limitation, ionizing molecular oxygen to allow for recombination to ozone. In some implementations, the nanobubble destructor 334 may be activated prior to disposal of the solution through the drain 340 if the disposal procedures or regulations prevent direct disposal of the gas-infused liquid. The nanobubble destructor 334 may destroy bubbles through methods such as returning the solution to a vapor state and depressurizing. Other implementations are also possible.

The gas supply 302 may include primary source gases that can be contained in gas canisters at high pressure, compressed air, or gases extracted from the atmosphere by using a concentrator to separate air into its components (e.g., oxygen, nitrogen, and so on), or any combination thereof. Specific gases can be selected for infusion into liquid to achieve certain physiochemical effects. For example, the control system 114 or the control circuit 202 may control one or more of the valves 304 to deliver the selected gas from one or more of the canisters for infusion into the liquid. For example, carbon dioxide gas can act as an acid, nitrogen gas can act as a surfactant for the liquid, or ethylene gas can act as a ripening agent for certain food products. The control system 114 (or control circuit 202) may control the valves 304 to deliver selected gases in specific proportions based on feedback from instrumentation of one or more of the sensors 112. A high-pressure gas supply line 308 may be used to inject gas into the circulation loop 334 to be fed into microbubble and nanobubble generator 310 and the microbubble generator 314.

In this example, the gas may be processed in the gas processing unit 306 to alter certain gas properties. For example, the gas processing unit 306 may ionize molecular gaseous oxygen for proportional recombination into ozone. The gas handling subsystem 204 may also be fed with recycled gas from a nanobubble isolation subsystem 208 through a gas recycle line 318 to promote more efficient use of gas. Other implementations are also possible.

The nanobubble isolation subsystem 208 may be coupled to the gas handling subsystem 204 and to the solution circulation paths or subsystem 206. The nanobubble isolation subsystem 208 may receive a first input from the microbubble and nanobubble generator 310, which may provide a microbubble and nanobubble solution to the microbubble and nanobubble holding tank 316. The microbubble and nanobubble holding tank 316 may facilitate recapture of outgassing microbubbles to feed back into gas handling subsystem 204 through gas recycle line 318. The microbubble and nanobubble holding tank 316 may facilitate retention of microbubbles for a period of time prior to application to the treatment tank 104.

The nanobubble isolation subsystem 208 may include a valve to couple the microbubble and nanobubble holding tank 316 to a bubble separator 320 via a valve to provide nanobubbles to a nanobubble holding tank 322. The recapture of outgassing microbubbles may increase the efficiency of gas utilization and may help maintain atmospheric levels of certain gases (for example, ozone) at nonhazardous levels. The microbubble and nanobubble solution may be fed to the bubble separator 320 from the bottom of microbubble and nanobubble holding tank 316 to amplify the nanobubble to microbubble ratio. In one implementation, microbubble and nanobubble holding tank 316 may have a recycling line 318 coupled to the microbubble and nanobubble generator 310 without circulating through the circulation loop 324.

The bubble separator 320 may filter nanobubbles from the microbubble and nanobubble solution using, for example, degassing valve principles and/or other separation techniques related to differences in properties between the bubble distributions. Such separation processes can result in a solution infused predominately with nanobubbles. Such a nanobubble solution may be preferable to micro-nanobubble solutions in instances when the extra buoyancy of microbubbles is not needed or when a hyper saturation of one or more gases is favored to achieve certain physiochemical effects. For example, nanobubbles may be preferred in a situation when aerobic processes are desired to be accelerated in a waste holding pond through the addition of oxygen without leading to floatation resulting in overpowering odors (e.g. livestock farm). Since the nanobubbles remain in solution longer than the microbubbles, the nanobubbles may operate to provide the desired treatment processes without the rising of bubbles within the pond that may cause the release of the odors to that atmosphere that larger bubbles may cause. The bubble separator 320 may include an output coupled to the nanobubble holding tank 322.

Figure 4A:
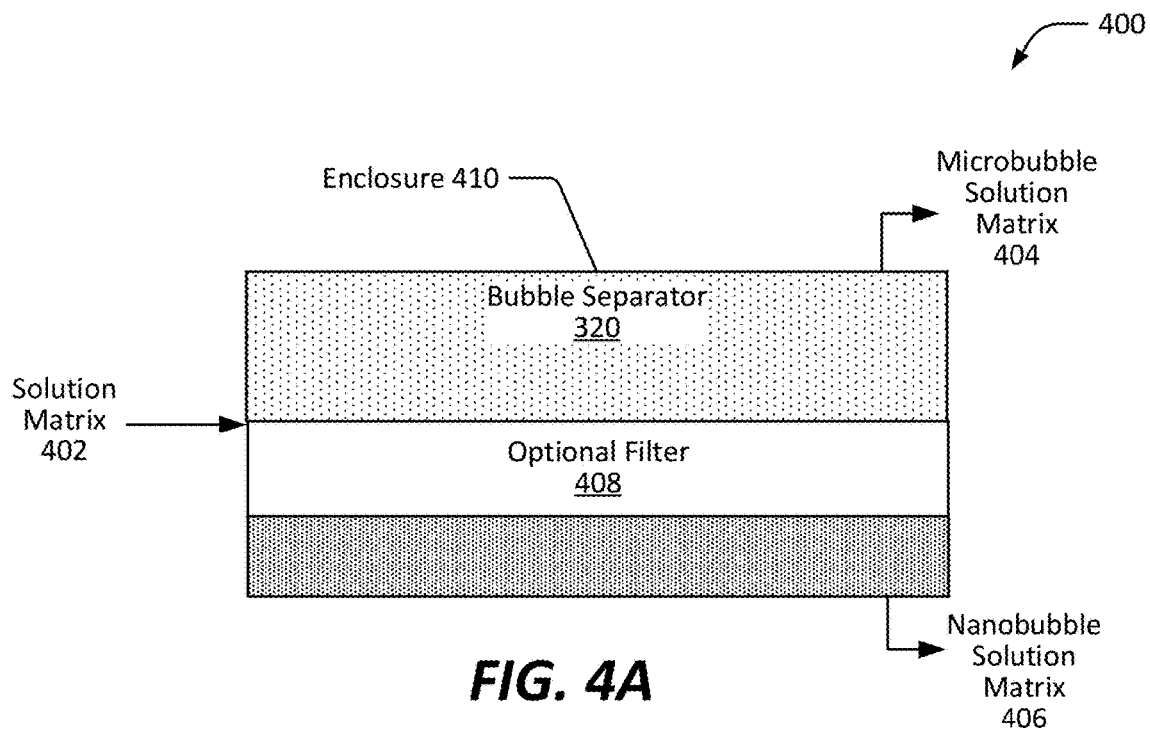
FIG. 4A depicts a block diagram of a bubble separator of the system of FIG. 3, in accordance with certain embodiments of the present disclosure.

FIG. 4A depicts a block diagram 400 of a bubble separator 320 of the system 300 of FIG. 3, in accordance with certain embodiments of the present disclosure. The bubble separator 320 may include an enclosure 410 including an input to receive a solution matrix 402 comprised of a liquid infused with microbubbles, nanobubbles, one or more dissolved gas, or any combination thereof. The bubble separator 320 may include a first output near an upper portion of the enclosure 410 to provide a microbubble solution matrix 404 and a second output near a lower portion of the enclosure 410 to provide a nanobubble solution matrix 406. In some implementations, the microbubble solution matrix 404 may include a liquid infused with microbubbles and possibly some nanobubbles. In some implementations, the nanobubble solution matrix 406 may include a liquid infused with nanobubbles. In both instances, the liquid infused with nanobubbles or the liquid infused with microbubbles may include one or more dissolved gases.

In some implementations, the bubble separator 320 may include a filter 408 that may allow nanobubbles to fall through to a lower portion of the enclosure 410 while preventing microbubbles from passing through. The filter 408 may be implemented as a baffle, a semi-permeable membrane, a screen, or another construct within the enclosure 410 that makes it difficult for microbubbles to flow through, but the diffusion/flow process may allow nanobubbles entrained within in the solution matrix 402 to penetrate the filter 408.

In this example, the bubble separator 320 operates to produce a first solution matrix that includes microbubbles and nanobubbles and to produce a second solution matrix that includes nanobubbles. The first solution may be provided as a microbubble solution matrix 404 that may be provided to the microbubble and nanobubble holding tank 316 in FIG. 3. The second solution may be provided as a nanobubble solution matrix 406 that may be provided to the nanobubble holding tank 322 in FIG. 3.

It should be appreciated that the separation of the microbubbles and the nanobubbles may be provided within the storage tank, instead of providing a bubble separator 320. An example of such an implementation is described below with respect to FIG. 4B.

Figure 4B:
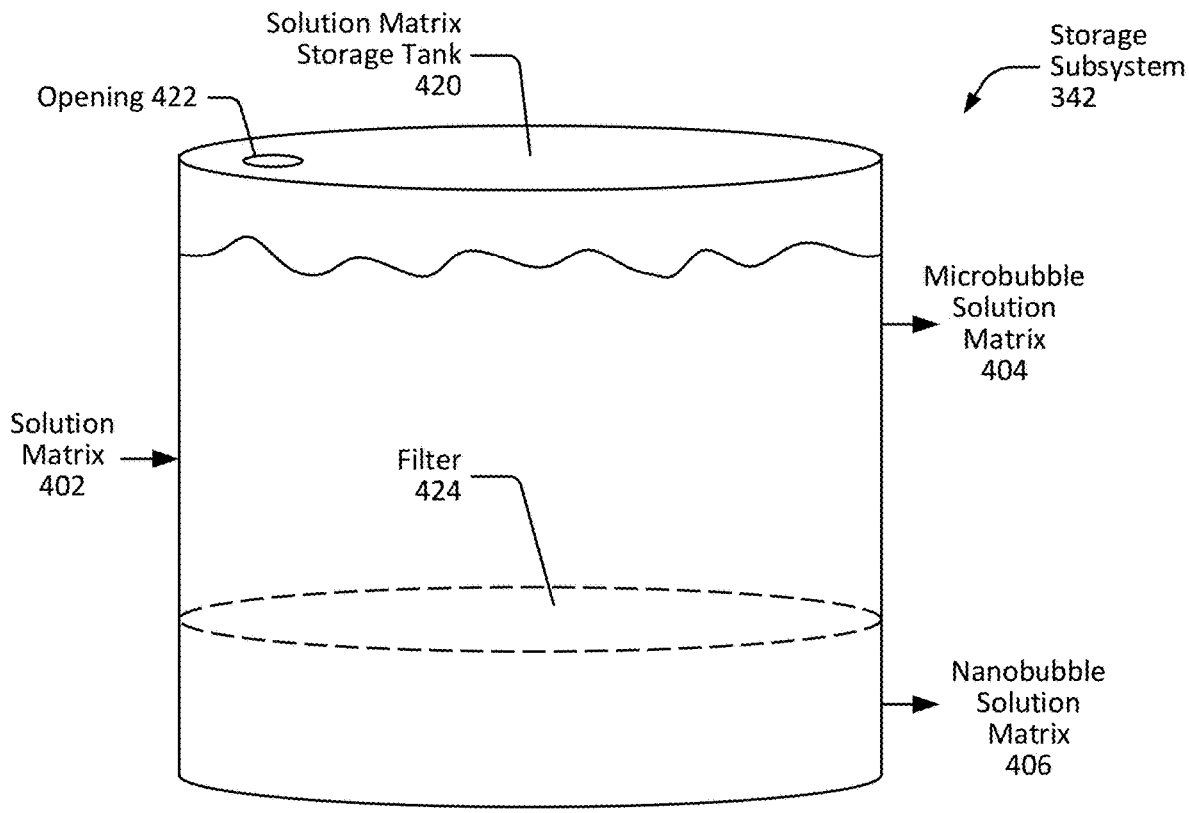
FIG. 4B depicts an alternative embodiment in which the bubble separator is implemented as part of a storage tank, in accordance with certain embodiments of the present disclosure.

FIG. 4B depicts an alternative embodiment in which the bubble separator 320 is implemented as part of a storage tank, in accordance with certain embodiments of the present disclosure. In FIG. 4B, an embodiment of a storage subsystem 342 is described that may include a solution matrix storage tank 420. The solution matrix storage tank 420 may include an input 422 to receive the solution matrix 402. The input may be positioned in the middle or at an upper portion of the solution matrix storage tank 420. The solution matrix storage tank 420 may include a solution matrix 402 that includes a liquid infused with microbubbles, nanobubbles, and dissolved gas.

The solution matrix storage tank 420 may further include a first output to provide a microbubble solution matrix 404 and a second output to provide a nanobubble solution matrix 406. The solution matrix storage tank 420 may include a filter 424 that may be positioned between the first output and the second output. The filter 424 may be implemented as a baffle, a semi-permeable membrane, a screen, or another construct within the enclosure 410 that makes it difficult for microbubbles to flow through, but the diffusion/flow process may allow nanobubbles entrained within in the solution matrix 402 to penetrate the filter 408.

Figure 5:
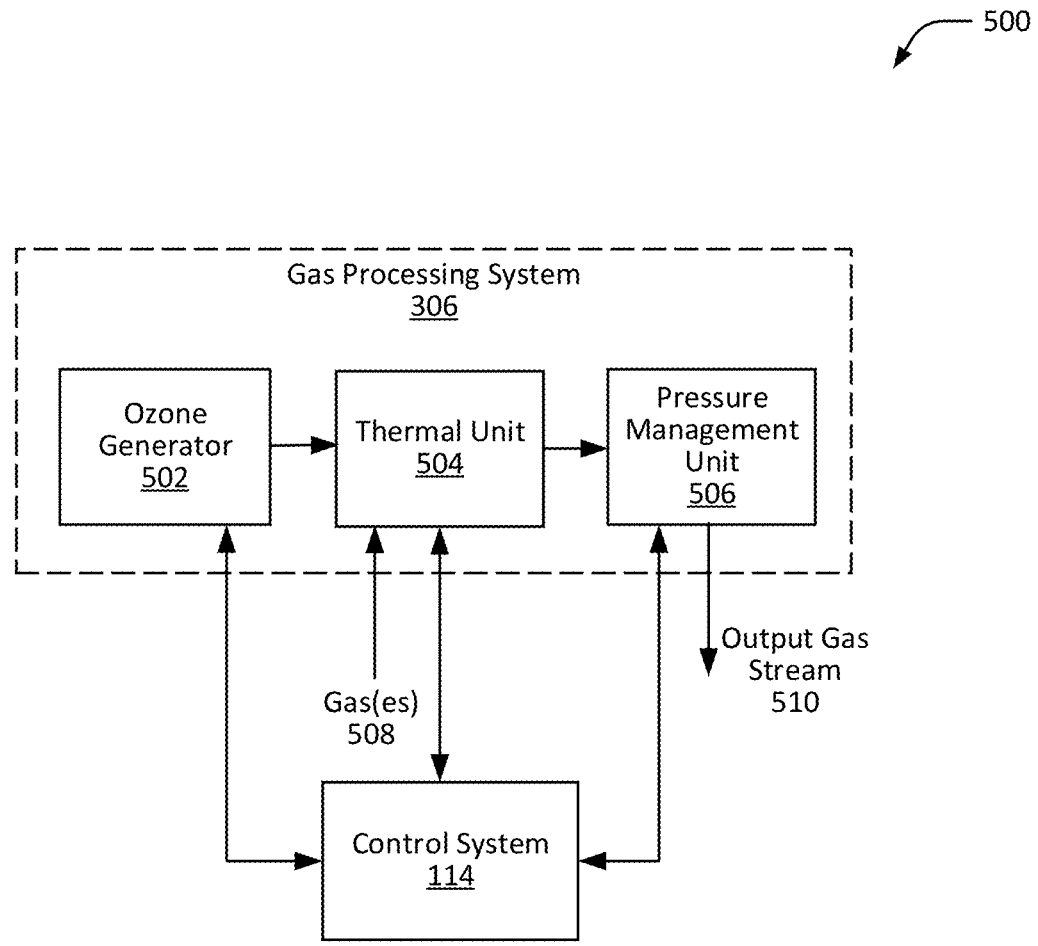
FIG. 5 depicts a diagram of the gas processing system of FIG. 3, in accordance with certain embodiments of the present disclosure.

FIG. 5 depicts a diagram 500 of the gas processing system 306 of FIG. 3, in accordance with certain embodiments of the present disclosure. The gas processing system 306 may include an ozone generator 502, a thermal unit 504, and a pressure management unit 506. The ozone generator 502 may generate ozone gas and provide the ozone gas to the thermal unit 504.

The thermal unit 504 may include an input to receive one or more gases. The thermal unit 504 may be configured to cool and compress the one or more gases. The thermal unit 504 may include an output to provide the thermally treated gas to a pressure management unit 506. The pressure management unit 506 may be configured to provide an output gas stream 510 having a selected pressure.

In the illustrated example, the ozone generator 502, the thermal unit 504, and the pressure management unit 506 may be coupled to a control system 114, which may provide control signals to control the production of the output gas stream 510. In some implementations, the control system 114 may be configured to adjust the temperature of the gases via a control signal to the thermal unit 504. The control system 114 may selectively activate the ozone generator 502 to produce ozone gas or to activate one or more valves to selectively deliver one or more gases 508 to the thermal unit 504. The control system 114 may also send one or more signals to the pressure management unit 506 to manage the pressure of the output gas stream 510. Other implementations are also possible.

Figure 6A:
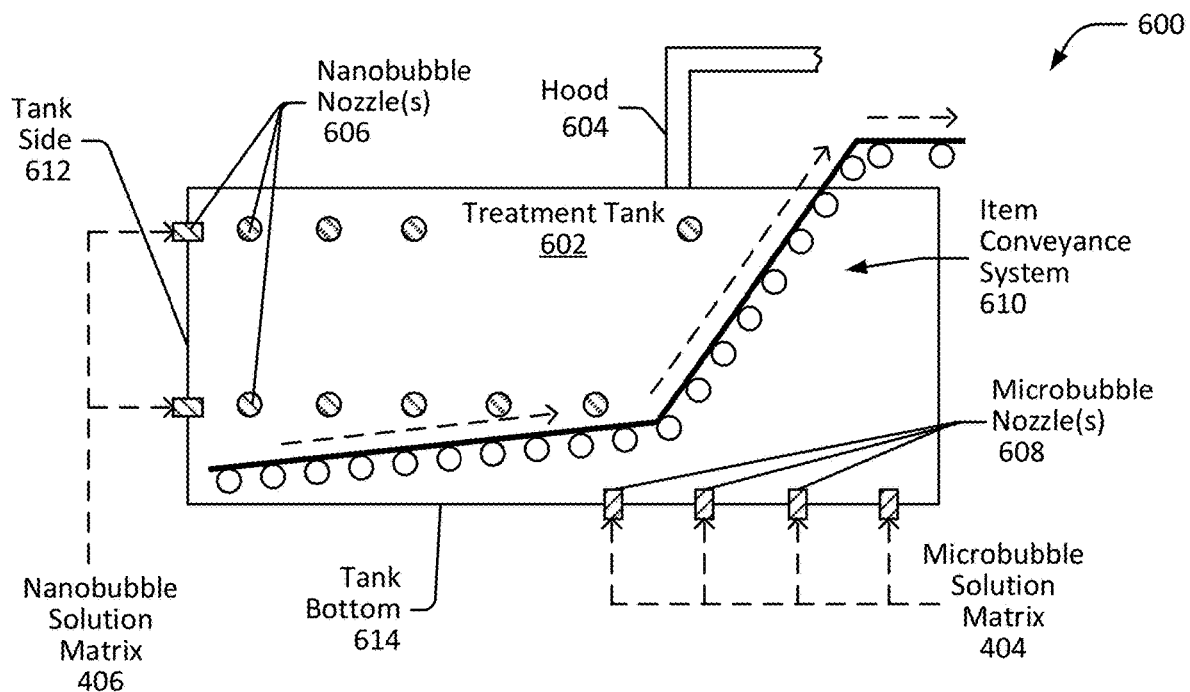
FIG. 6A depicts a diagram of a treatment tank system including nanobubble nozzles and microbubble nozzles, in accordance with certain embodiments of the present disclosure.

FIG. 6A depicts a diagram of a treatment tank system 600 including nanobubble nozzles 606 and microbubble nozzles 608, in accordance with certain embodiments of the present disclosure. The treatment tank system 600 may include a treatment tank 602 including a plurality of tank sides 612 and a tank bottom 614. The nanobubble nozzles 606 may be provided in the tank sides 612, and the microbubble nozzles 604 may be provided in the tank bottom 614. The microbubble solution matrix 404 provided through the microbubble nozzles 608 may be positioned on the tank bottom 614 so that the microbubbles may rise within the treatment tank 602. In some implementations, the treatment tank 602 may also include a mechanical agitation feature to introduce turbulence to the fluid within the treatment tank 602.

In this example, the treatment tank 602 may include an item conveyance system 610 that advances one or more objects from a first side (a left side in the drawing) to a second side and out of the treatment tank 602. In this example, the nanobubble nozzles 606 may be positioned on the left side and middle portion of the treatment tank 602, and the microbubble nozzles 608 may be positioned toward the right side of the treatment tank 602. In this particular implementation, the product or item may be processed using the nanobubble solution matrix 406 first, and then may be processed using the microbubble solution matrix 404. In other implementations, the microbubble solution matrix 404 may be applied to the product throughout the treatment tank 602.

In the illustrated example, the microbubble solution matrix 404 may include a liquid infused with microbubbles, which may rise quickly through the solution in the treatment tank 602. In this example, the nanobubble solution matrix 406 may create current flow within the treatment solution, pushing the product towards the microbubble solution matrix 404 on the right side of the treatment tank 602. Thus, the bubbles may primarily rise on the right side, and a hood 604 may be provided on the right side of the treatment tank 602 to capture and direct the gas from the microbubbles and nanobubbles caused to rise and outgas from the microbubble mixture into another tank or into a filter that may remove unwanted gasses such as ozone gas, for example. Other implementations are also possible.

In the illustrated example, it should be appreciated that nanobubble nozzles 606 may be provided on the sides of the treatment tank 602, including near a top portion of the treatment tank 602 (albeit below a top surface of the treatment solution). The microbubble nozzles 608 may be positioned at or near the bottom of the treatment tank 602 to take advantage of the buoyancy-induced movement of the microbubbles within the treatment solution.

In some implementations, the microbubble nozzles 608 and the nanobubble nozzles 606 may be electrically and independently controllable to open, close, adjust the streams, adjust spray directions, or any combination thereof. An example of an electrically controllable nozzle 606 or 608 is described below with respect to FIG. 6B.

Figure 6B:
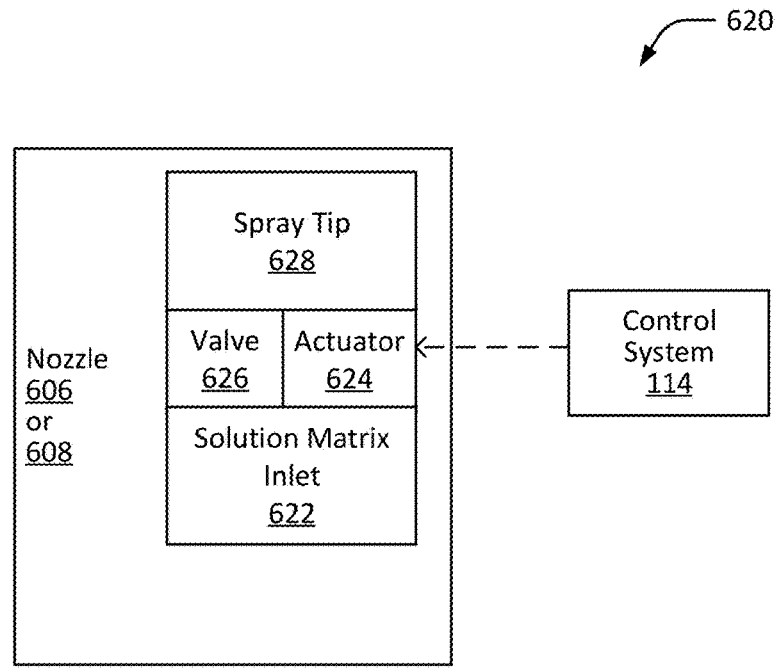
FIG. 6B depicts a block diagram of a nozzle of the treatment tank system of FIG. 6A.

FIG. 6B depicts a block diagram 620 of a nozzle 606 or 608 of the treatment tank system 600 of FIG. 6A. In this example, each nozzle 606 or 608 may include a solution matrix inlet 622 to receive a solution matrix (microbubble, nanobubble, dissolved gas, or any combination thereof). The nozzle 606 or 608 may further include an actuator 624 communicatively coupled to a control system 114. The actuator 624 may be coupled to a valve 626 and to a spray tip 628. The actuator 624 may open and close the valve 626 to provide a selected flow of the solution matrix from the solution matrix inlet 622 to the spray tip 628 in response to signals from the control system 114. The actuator 624 may be coupled to the spray tip 628 and may be configured to control the stream and the direction of the stream by selectively controlling the spray tip 628 in response to signals from the control system 144.

In some implementations, each nozzle 606 or 608 may be controlled independently of other nozzles 606 or 608 such that the treatment tank 602 may have multiple different streams and stream directions within the tank. In one implementation, the directions of the streams may be arranged to create a selected circulation of treatment fluid within the treatment tank 602. In another implementation, the directions of the streams may be arranged to create and manage turbulence within the treatment solution. Other implementations are also possible.

Figure 7A:
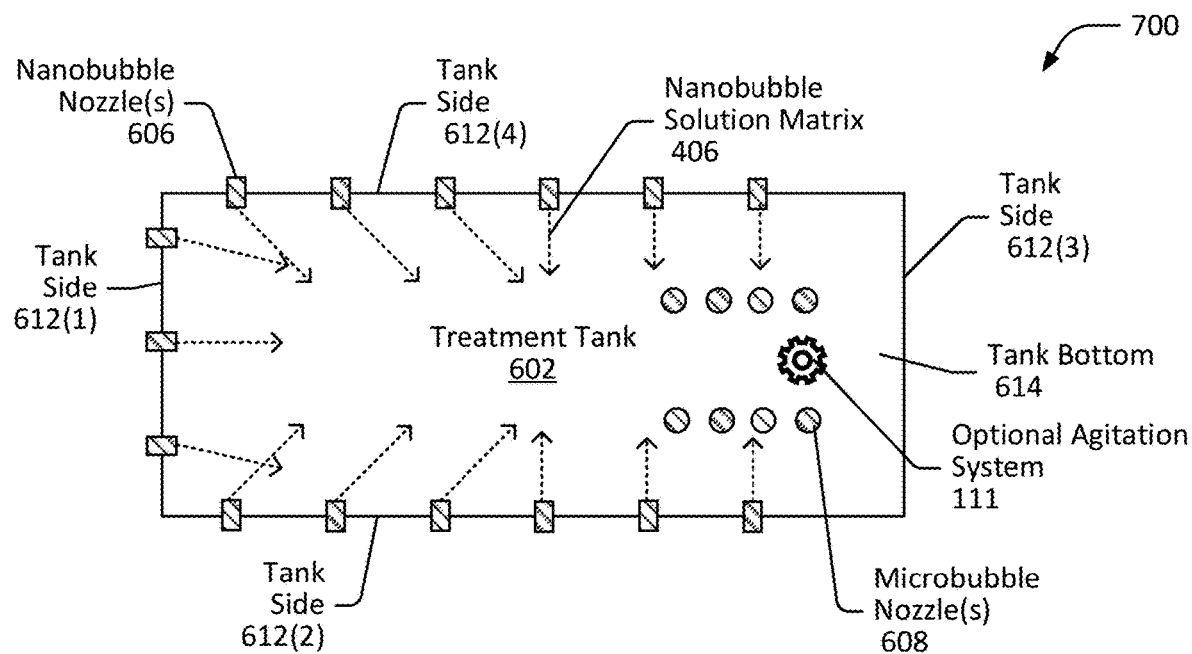
FIGS. 7A-7B depict block diagrams of a treatment tank with nanobubble nozzles configured to direct a nanobubble solution matrix at different angles within the treatment tank, in accordance with certain embodiments of the present disclosure.
Figure 7B:
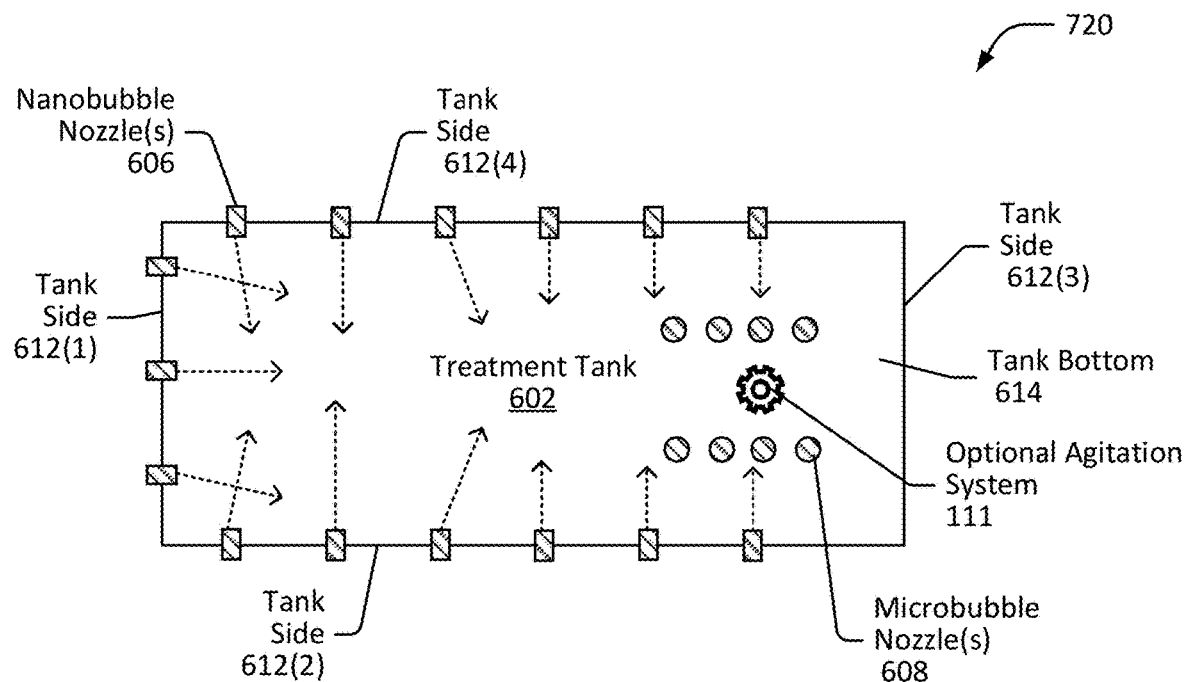

FIGS. 7A-7B depict block diagrams of a treatment tank 602 with nanobubble nozzles 606 configured to direct a nanobubble solution matrix at different angles within the treatment tank 602, in accordance with certain embodiments of the present disclosure. In FIG. 7A, the treatment tank 602 is shown from a top view 700. The microbubble nozzles 608 are positioned toward a right side of the treatment tank 602 along the tank bottom 614. In this example, the nanobubble nozzles 606 are positioned along a first side 612(1), a second side 612(2), and a fourth side 612(4). In this example, the third side 612(3) does not include nanobubble nozzles 606.

In this example, the nanobubble nozzles 606 may be controlled to direct the second solution matrix of nanobubbles to form a current or direction of flow of the treatment solution within the treatment tank 602. As discussed above, the flow volume, the pressure, the direction, and other parameters of the nanobubble nozzles 606 may be controlled to provide a selected current and selected treatment solution. Other implementations are also possible.

In some implementations, the treatment tank 602 may include an agitation system 111 configured to facilitate circulation of the nanobubble solution matrix to provide a cleaning function. The agitation system 111 can include roller brushes, high pressure spray nozzles, other elements, or any combination thereof to facilitate turbulence within the treatment tank 602 and cleaning of the object.

In FIG. 7B, a second view 720 of the treatment tank 602 may include the nanobubble nozzles 606 having different fluid flow directions as compared to the embodiment depicted in FIG. 7A. It should be appreciated that the control system 114 or the control circuit 202 may be configured to control the nanobubble nozzles 606 to provide a selected fluid flow, selected spray, selected directions, and so on.

In some implementations, the agitation system 111 may introduce turbulence and enhance overall circulation of the nanobubble solution matrix within the treatment tank 602. In other implementations, the nozzles may be sufficient to generate turbulence by directing fluid flow into the treatment tank 602. Other implementations are also possible.

Figure 8:
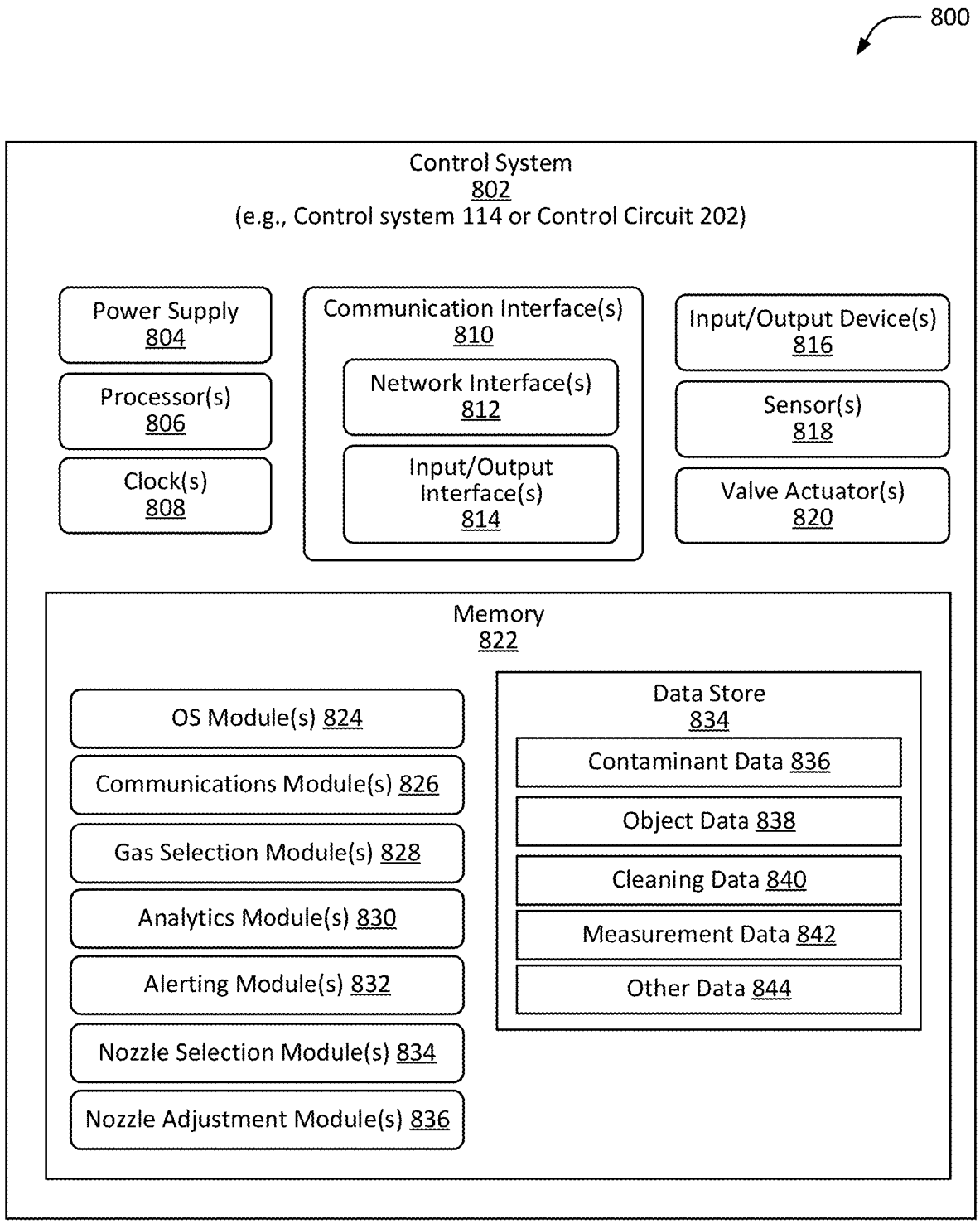
FIG. 8 depicts a block diagram of a control system for use with the systems of FIGS. 1-7, in accordance with certain embodiments of the present disclosure.

FIG. 8 depicts a block diagram 800 of a control system 802 for use with the systems of FIGS. 1-7, in accordance with certain embodiments of the present disclosure. The control system 802 may be an embodiment of the control system 114 of FIG. 1 or the control circuit 202 of FIG. 2. The control system 802 may be implemented as a computing device or may be implemented as a programmable circuit device.

The control system 802 may include one or more power supplies 804, such as batteries, transformers for managing current and voltage from a wall socket, another power supply, or any combination thereof. The one or more power supplies 804 may deliver operating power to the various components of the control system 802.

The control system 802 may further include one or more processors 806, which may be configured to execute processor-readable instructions. The control system 802 may also include one or more clocks 808 to provide timing signals, which may be used by the one or more processors 806 or by various components to facilitate operations, synchronization, and so on.

The control system 802 may include one or more communication interfaces 810. The communication interfaces 810 may include one or more network interfaces 812 to communicate data to and receive data from a network 116. The network interfaces 812 may include connection interfaces to receive network cables, wireless transceivers to facilitate radio frequency communications, and so on.

The communication interfaces 810 may also include one or more input/output (I/O) interfaces 814. The I/O interfaces 814 may be configured to couple to one or more input/output devices 816, one or more sensors 818, and one or more valve actuators 820. The input/output devices 816 may include input devices including a touch-sensitive interface, a keypad, a pointer device, a microphone, a camera, a scanner, another input device, or any combination thereof. The input/output devices 816 may also include output devices such as a display, a speaker, a printer, a haptic feedback device, another output device, or any combination thereof. In some implementations, the input/output devices 816 may include a combination of an output display device and an input touch-sensitive interface (such as a touchscreen).

The sensors 818 may include temperature sensors, microbubble detection sensors, nanobubble detection sensors, flow rate sensors, chemical composition sensors, water quality measurements and so on. Each sensor 818 may generate an electrical signal that is proportional to a measured parameter.

The valve actuators 820 may be coupled to the I/O interfaces 814 to receive a signal. The valve actuators 820 may be responsive to signals from the I/O interfaces 814 to open and close, adjusting the flow of fluid or gas within the system.

The control system 802 may include one or more memories 822, which may include hard disc drives, solid-state drives, cache memory, random access memory (RAM), read only memory (ROM), other memory devices, or any combination thereof. The memory 822 may store processor-readable instructions and data.

The memory 822 may include one or more operating system (OS) modules 824, which may be executed by the processors 806 to control operation of the control system 802. The memory 822 may include one or more communication modules 826 that, when executed, may cause the processor 806 to control operation of the communication interfaces 810.

The memory 822 may include one or more gas selection modules 828 that, when executed, may cause the processors 806 to determine a type of treatment, such as cleaning, ripening, etc. For example, some chemical compositions or gas concentrations may have better efficiency at killing bacteria in high organic load water than others. The gas selection modules 828 may cause the processor 806 to determine the type of contaminant to be cleaned and may select a gas suitable for the determined contaminant. In another example, some chemical compositions may facilitate organic growth or ripening, and the gas selection module 828 may cause the processor 806 to determine a gas corresponding to growth or ripening, such as nitrogen or ethylene.

The memory 822 may include an analytics module 830 that, when executed, may cause the processor 806 to determine one or more chemical compositions, one or more solution components (such as dissolved gas(es), microbubbles, nanobubbles, or any combination thereof). The analytics module 830 may cause the processor 806 to determine the ratio of nanobubbles to microbubbles, the ratio of selected gases, decay rates of the solution with respect to nanobubbles and microbubbles, and so on, depending on the selected application.

The memory 822 may also include an alerting module 832 that, when executed, may cause the processors 806 to send an alert to a computing device 118 or to an output device of the I/O devices 816. The alert may include text, images, audio data, video data, other data, or any combination thereof. In some implementations, the alerting module 832 may cause the processor 806 to send a message including information to an operator to facilitate decision-making, parameter adjustments, and so on. In an example, the alerting module 832 may cause the processor 806 to send an interface including data and including one or more control options accessible by a user to adjust one or more parameters or to configure operation of the overall system. Other implementations are also possible.

The memory 822 may also include a data store 834. The data store 834 may include contaminant data 836, which may include information about which gases and which types of bubbles may impact selected contaminants. The data store 834 may also include object data 838, such as product information, item information, and so on. In an example, the object data 838 may include information about lettuce or some other item to be cleaned.

The memory 822 may also include cleaning data 840. The cleaning data 840 may include information about cleaning of objects 110. Further, the cleaning data 840 may include information about selected mixes of microbubbles, nanobubbles, dissolved gas, and so on, as well as the selected gases. In some implementations, the cleaning data 840 may include product lot information correlated to timing information. The cleaning data 840 may also include treatment solution data (ratios, chemicals, and so on). In some implementations, the cleaning data 840 may be used to determine cleaning information associated with a particular lot. Other implementations are also possible.

The data store 834 may include measurement data 842 that may have been captured by the one or more sensors 818 and stored with a time stamp. The data store 834 may also include other data 844.

The production and mixture of microbubbles and nanobubbles can be regulated by the control system 802, based on input data determined by the one or more sensors 818, which may be embodiments of the sensors 112. The sensors 818 may be distributed across one or more components of the system The control system 802 may include a plurality of closed-loop control routines that allow, for example, setpoint targets to be determined and maintained at selected levels while counteracting disturbances. For example, variations in ambient temperature, feedstock or organic load may disturb the control loop but the control system 802 may automatically adjust operation based on the parameters determined by the sensors and based on such disturbances. The control system 802 may be tuned manually or automatically, depending on the implementation.

In some implementations, the control system 802 may direct flow-through microbubble and nanobubble circulation through the circulation loop 334 by controlling one or more of a plurality of valves to isolate or engage various components of the circulation loop 324 as needed.

The sensors 818 (and/or sensors 112) may measure physical properties, such as temperatures, volumetric flows, mass flows, pressures, gas content, organic load, bubble size, bubble density, other parameters, or any combination thereof. In some implementations, the sensors 818 (and/or sensors 112) may supply pre-processed data to the analytics module 830 to enable, among other things, the continuous control of various pathogen cleaning options of the circulation loop 324, such as ratio of microbubble to nanobubble content. Sensors 818 and/or 112 may be incorporated throughout the circulation loop 324 to provide the analytics modules 830 with data. Such sensing instrumentation may include, without limitation, continuous measurement and/or sequential or time-based sampling sub-systems. Data pre-processing may include, without limitation, normalization, characterization, and correction of measured values, such as electrical current, for environmental factors, such as pH level. Other implementations are also possible.

Figure 9:
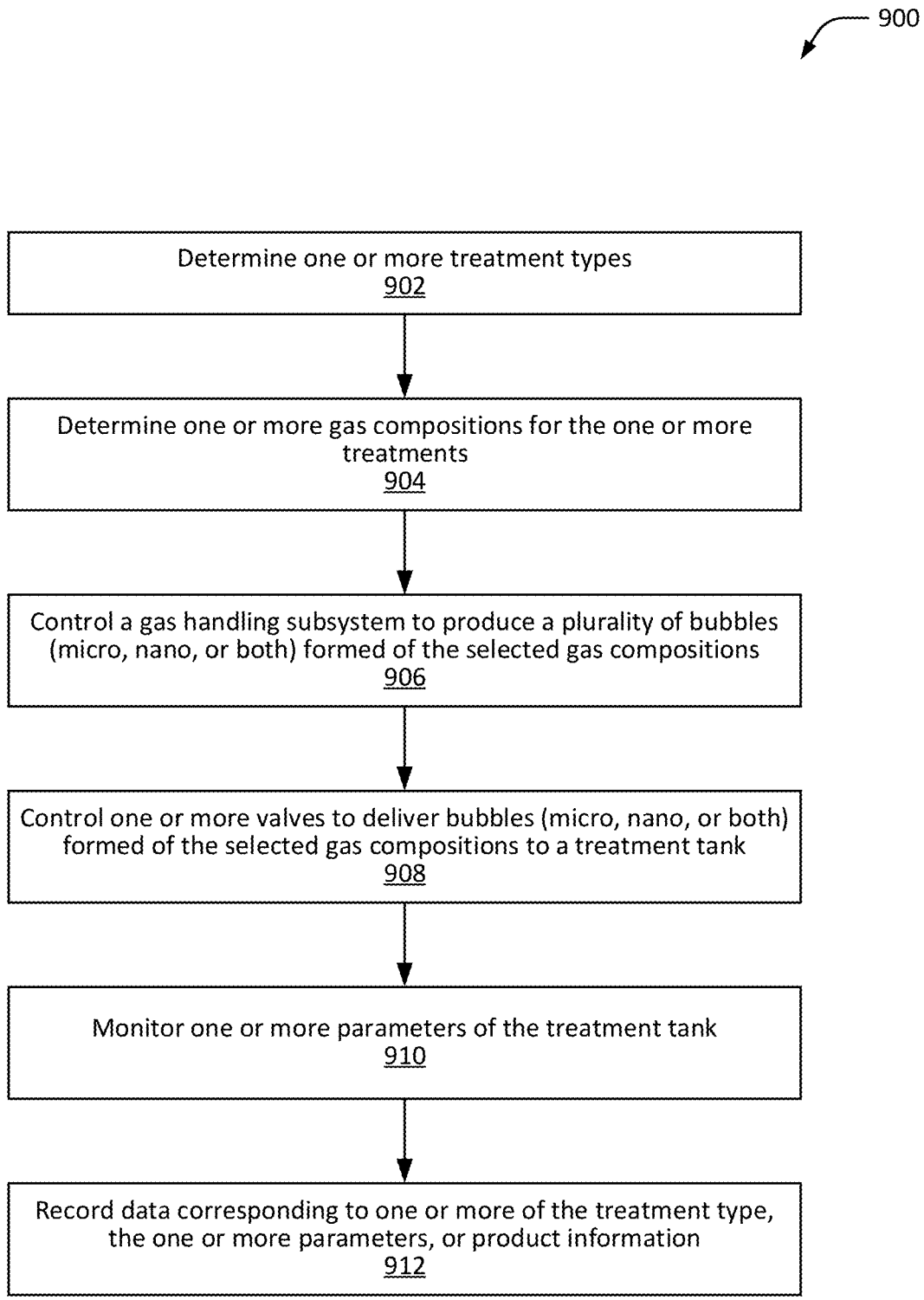
FIG. 9 depicts a flow diagram of a method of removing contaminants from a selected object, in accordance with certain embodiments of the present disclosure.

FIG. 9 depicts a flow diagram of a method 900 of removing contaminants from a selected object, in accordance with certain embodiments of the present disclosure. At 902, the method 900 may include determining one or more treatment types. The one or more treatment types may be based on a type of product, a selected outcome, other information, or any combination thereof. For example, particulates or contaminants may be different for a produce item, such as fruit or vegetables, as compared to a silicon circuit wafer, and the treatment type may be selected to kill bacteria, yeast, or mold, or to remove pathogens. In another example, the treatment type may be selected to apply or remove a coating to a product, to apply one or more chemicals to extend the shelf life of the product, and so on. The treatment options may include cleaning, ripening, extending shelf-life, applying coatings, or any combination thereof. Other implementations are also possible.

At 904, the method 900 may include determining one or more gas compositions for the one or more treatments. The gas compositions may include determination of the ratio of nanobubbles to microbubbles as well as the chemical composition. In other implementations, the one or more gas compositions may include a first gas, a second gas, and so on. Other implementations are also possible.

At 906, the method 900 may include controlling a gas handling subsystem to produce a plurality of bubbles (microbubbles, nanobubbles, or both) formed of the selected gas compositions. In one example, the gas handling subsystem may produce microbubbles formed from a first chemical composition and nanobubbles formed from a second chemical composition. In another example, the gas handling system may produce a ratio of nanobubbles to microbubbles formed of a selected chemical composition. In yet another example, the gas handling system may produce a first ratio of nanobubbles to microbubbles of a first chemical composition and a second ratio of nanobubbles to microbubbles of a second chemical composition. Other implementations are also possible.

At 908, the method 900 may include controlling one or more valves to deliver bubbles (microbubbles, nanobubbles, or both) formed of the selected gas compositions to a treatment tank 102. In this example, the bubbles may be delivered as part of a solution via nozzles 340, 406, or 408 (spray nozzles, submerged nozzles, or both) to apply the bubble solution to an object 110, such as a product. Alternatively, the nozzles may spray one or more solution matrices including the microbubbles, the nanobubbles, or both may be applied directly to the products. Other implementations are also possible.

At 910, the method 900 may include monitoring one or more parameters of the treatment tank. The parameters may be monitored using one or more sensors 718 or 112. In another implementation, the parameters may be monitored based on the elapsing of a predetermined period of time. For example, if a product is to be immersed in the treatment solution 104 for a predetermined time period in order to kill bacteria, the control system 702 may monitor a time parameter to determine when the treatment operation is complete. In other implementations, chemical concentrations may be monitored using sensors. In still other implementations, the sensors may monitor flow volume of each of the nozzles, flow volume of each solution matrix, temperature of each solution matrix and of the treatment solution, other parameters, and so on. Other implementations are also possible.

At 912, the method 900 may include recording data corresponding to one or more of the treatment type, the one or more parameters, or the product information. The recorded data may be correlated to time and date information and to products treated by the system. Other implementations are also possible.

It should be appreciated that some treatment processes may be batch processes, while other treatment processes may be continuous. Other implementations are also possible.

Figure 10:
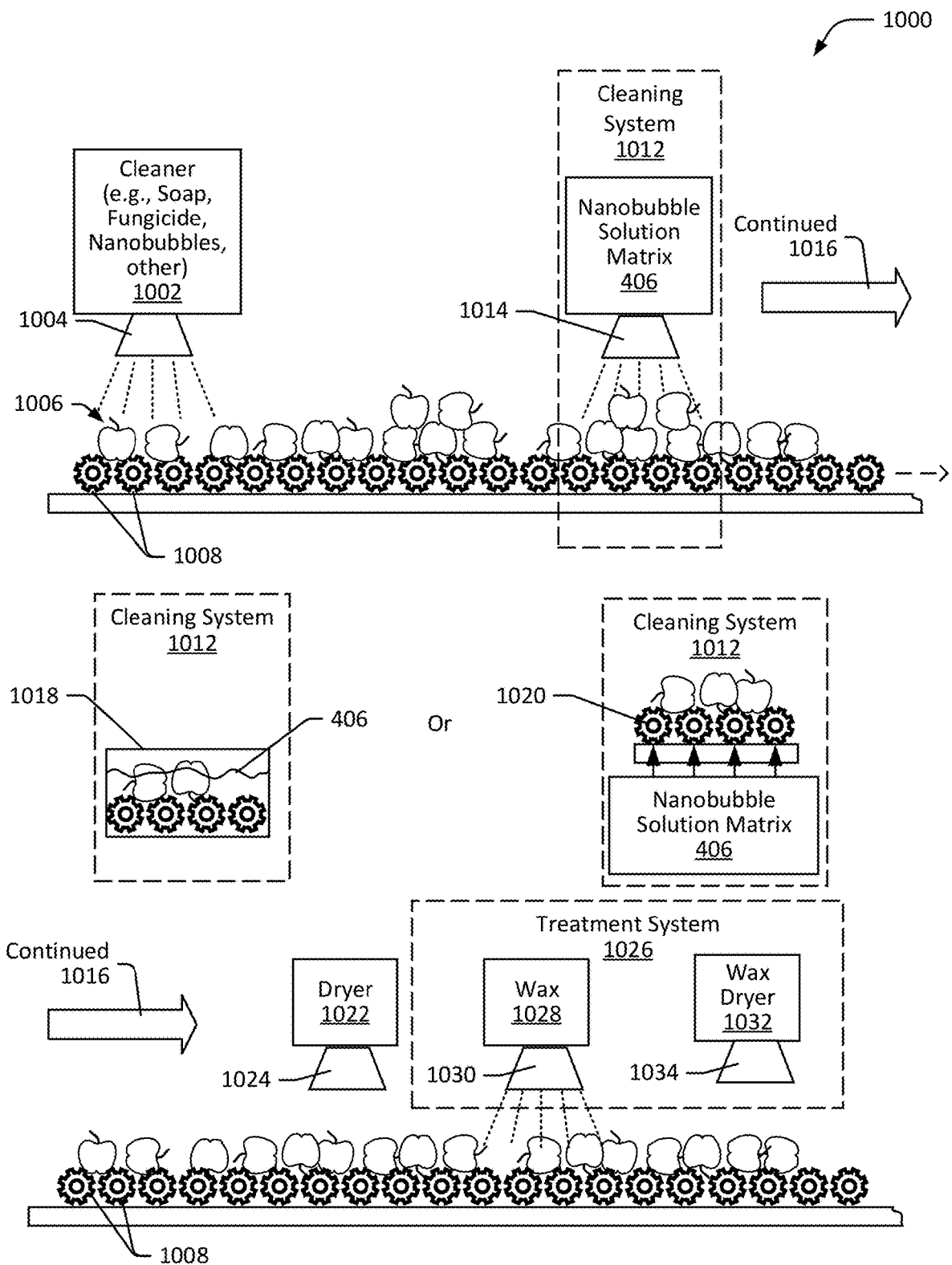
FIG. 10 depicts a block diagram of a system including agitation to facilitate cleaning with nanobubbles, in accordance with certain embodiments of the present disclosure.

FIG. 10 depicts a block diagram of a system 1000 including agitation to facilitate cleaning with nanobubbles, in accordance with certain embodiments of the present disclosure. The system 1000 may include a cleaner tank 1002, which may include soap, fungicide, nanobubble solution, other solutions, or any combination thereof and which may be delivered by a sprayer 1004 onto one or more products 1006. In some implementations, the nanobubbles of at least one of a first nanobubble solution matrix or a second nanobubble solution matrix may include the fungicide. In the illustrated example, the one or more products 1006 may include fruit (such as apples, peaches, oranges, and so on), vegetables (such as peppers, tomatoes, potatoes, and so on), or any combination thereof. In other examples, the one or more products 1006 may include other types of products, such as circuit components, mechanical elements, and so on. The one or more products 1006 may be moved along a treatment path by one or more rollers or brushes 1008, which may scrub or otherwise brush the products 1006 as they are moved along. In some implementations, the system 1000 may also include a cleaning system 1012 to apply a nanobubble solution matrix 406 to the one or more products 1006 via one or more sprayers 1014 as the products continue along the rollers or brushes 1008. The process is then continued at 1016.

It should be understood that the cleaning system 1012 may be implemented in a variety of different ways. In one example (as shown), the nanobubble solution matrix 406 may be applied to the one or more products 1006 via a sprayer 1014, a waterfall, or other delivery mechanism. In an alternative example, the one or more products 1006 may be immersed in a tank 1018 including the nanobubble solution matrix 406. In this example, the tank 1018 may include rollers or may include rolling brushes to assist in the cleaning process. The brushes 1008 may agitate the nanobubble solution matrix 406 to facilitate cleaning or may contact the products 1006 to brush debris away within the nanobubble solution matrix 406.

In another alternative example, the cleaning system 1012 may include the tank 1018 or not and may include a delivery mechanism for the nanobubble solution matrix 406 that includes the rollers or brushes 1008. The brushes 1020 may include bristles, which define lumens or tubes to deliver the nanobubble solution matrix 406 to the one or more products 1006. Other delivery mechanisms are also possible. In each instance, rollers or brushes 1006 (or the brushes 1020) may contact the one or more products 1006 or otherwise agitate the nanobubble solution matrix 406 to facilitate and augment the cleaning functionality provided by the bubbles. Other implementations are also possible.

After application of the nanobubble solution matrix 406, the system 1000 may continue at 1016 to advance the one or more products 1006 along the roller 1024. The system 1000 can include a dryer 1022 with a nozzle 1024 to dry the one or more products 1006.

In some implementations, the system 1000 may further include a treatment system 1026, which may provide further processing to prepare the one or more products 1006 for a next stage, such as packaging for shipment, display in a retail environment, and so on. In this example, the treatment system 1026 may be configured to apply wax 1028 via a sprayer 1030 and may dry the wax using a wax dryer 1032 having a nozzle 1034 to direct dry air over the produce 1006.

It should be understood that the example of the of FIG. 10 the order of the processes applied by the system 1000 may vary based on the implementation and based on the type of product 1006. In an example, the wax 1030 and wax dryer 1034 may be omitted, for example, when the product 1006 is a lettuce, circuits, or other products for which the gloss or shine is not important. Other implementations are also possible.

The nanobubble solution matrix 406, in this instance, may be used to remove the fungicide, soap, or other chemicals from the produce. The brushes 1008 may cooperate to agitate one or more of the nanobubble solution matrix 406 or the product 1006, thereby facilitating removal of the unwanted chemicals from the produce 1006.

In an example, to be effective, the fungicide or other chemical may require a period of time on the produce 1006 to be effective. An example of a method of using the nanobubble solution matrix to clean produce is described below with respect to FIG. 11.

Figure 11:
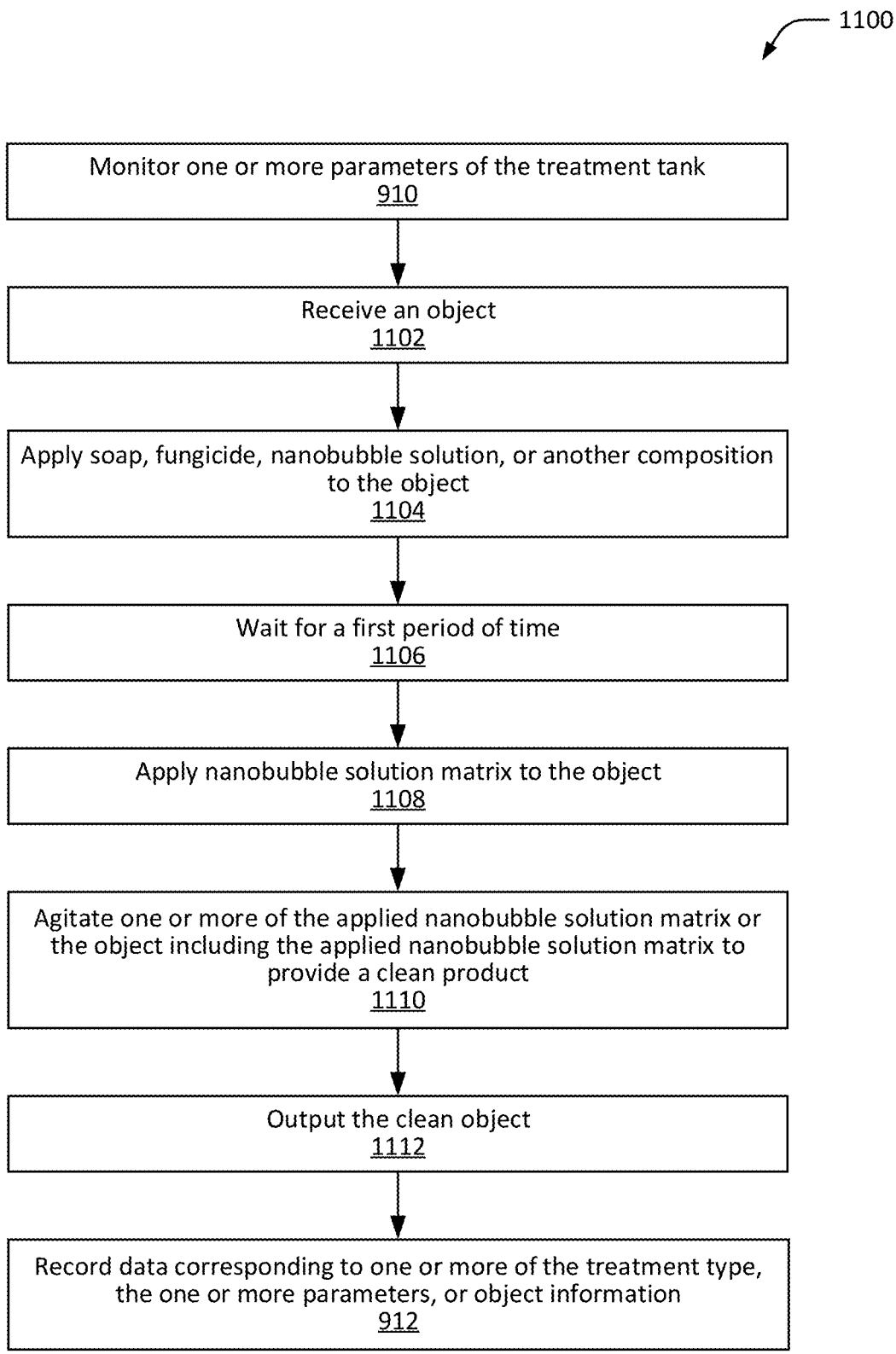
FIG. 11 depicts a flow diagram of a method of cleaning produce, in accordance with certain embodiments of the present disclosure.

FIG. 11 depicts a flow diagram of a method 1100 of cleaning produce, in accordance with certain embodiments of the present disclosure. In some implementations, the method 1100 may be performed between block 910 and 912 in FIG. 9. In another implementation, the method 1100 may be performed after the method of FIG. 9.

In this example, after one or more parameters of the treatment tank are monitored (at 910 in FIG. 9), the method 1100 may include receiving an object, at 1102. In an example, the object may be received at an input to the system, such as by placing, pouring, or otherwise providing the object to the system. The object may be fruit, produce, a circuit, another type of object, and so on.

At 1104, the method 1100 may apply a cleaning solution to the product. In some implementations, the cleaning solution may include soap, fungicide, a nanobubble solution matrix, another cleaning solution, or any combination thereof to the object.

At 1106, the method 1100 may include waiting for a first period of time. The period of time may be sixty seconds, ninety seconds, or another period of time.

At 1108, the method 1100 may include applying a nanobubble solution matrix to the object. The nanobubble solution matrix may be applied by spraying it onto the produce, by delivering the solution through a waterfall type of application, by putting the object into a bath or tank including the nanobubble solution matrix, and so on. In some implementations, the nanobubble solution matrix may include a first nanobubble solution having a first composition (such as a fungicide) and a second nanobubble solution having a second composition (such as ozone).

At 1110, the method 1100 may include mechanically agitating one or more of the applied nanobubble solution matrix or the object including the applied nanobubble solution matrix to provide a clean product. In some implementations, the solution matrix or the object may be agitated by introducing the nanobubble solution matrix through high pressure nozzles that cause turbulence within the treatment tank. In other implementation, the solution matrix or the object may be mechanically agitated by stirring or otherwise agitating the nanobubble solution matrix using a roller brush or other mechanical device. In some implementations, the object may be mechanically agitated by turning or brushing the produce. Other implementations are also possible. In some implementations, the agitation may be provided for a second period of time, which may be longer than the first period of time or which may be shorter than the first period of time, depending on the product and the implementation.

At 1112, the method 1100 may include outputting the clean product. In an example, the clean product may be provided to a drying system to dry the product and then may be coated in wax or other material, which may be dried to provide a selected sheen. Other processes are also possible.

In conjunction with the systems and methods described above with respect to FIGS. 1-11, a system may include a circulation subsystem and a circuit coupled to the circulation subsystem. The circuit may provide one or more signals to control the circulation subsystem to circulate a treatment solution including one or more of microbubbles or nanobubbles in a selected ratio. In one aspect, the nanobubbles may include a first gas, and the microbubbles may include a second gas. In another aspect, the treatment solution may include a first percentage of nanobubbles and a second percentage of microbubbles.

In some embodiments, a system includes a gas handling subsystem, a microbubble and nanobubble generator, a nanobubble isolation system, and a circuit. The gas handling subsystem may provide one or more gases. The microbubble and nanobubble generator may infuse a liquid with the one or more gases to produce a solution. The nanobubble isolation system may produce a first solution including predominately microbubbles and a second solution including predominately nanobubbles. The circuit may be coupled to the nanobubble isolation system and may provide one or more signals to control the nanobubble isolation system to produce a treatment solution including a first amount of the first solution and a second amount of the second solution. The treatment solution may include a first percentage of microbubbles and a second percentage of nanobubbles.

Additionally, in some implementations, the nanobubble solution matrix may be introduced into a treatment tank under pressure, providing turbulence within the fluid. In other implementations, the nanobubble solution may be introduced by spraying or pouring a composition including the nanobubble solution matrix over the objects. In still other implementations, the nanobubble solution may be put onto the object by the brushes or rollers. For example, the rollers may include one or more bristles that define lumens or tubes through which the nanobubble solution matrix may flow from a solution source to the product. Other implementations are also possible.

Although the present invention has been described with reference to preferred embodiments, workers skilled in the art will recognize that changes may be made in form and detail without departing from the scope of the invention.

What is claimed is:

1. A system comprising:
   a bubble generator to infuse a liquid with the one or more gases to produce an initial solution matrix including a liquid infused with microbubbles and nanobubbles;
   a bubble separator coupled to the bubble generator to receive the initial solution matrix, the bubble separator including an upper portion, a lower portion and a nanobubble solution matrix output in the lower portion, wherein the microbubbles within the initial solution matrix rise to the upper portion due to buoyancy to produce a first solution matrix comprising a liquid infused with microbubbles and nanobubbles in the upper portion and to produce a nanobubble solution matrix comprised of the liquid infused predominately with nanobubbles in the lower portion;
   a circulation subsystem coupled to the nanobubble solution matrix output to receive the nanobubble solution matrix, the circulation system being configured to provide the nanobubble solution matrix to an object to be cleaned and to agitate one or more of the object to be cleaned or the nanobubble solution matrix; and
   a control circuit coupled to the circulation subsystem, wherein the control circuit generates one or more signals to control the circulation subsystem to provide the nanobubble solution matrix to the object.

2. The system of claim 1, wherein the circulation subsystem comprises one or more roller brushes configured to turn to provide agitation of one or more of the object to be cleaned or the nanobubble solution matrix.

3. The system of claim 1, wherein the circulation subsystem comprises one or more nozzles to circulate the nanobubble solution matrix to provide agitation.

4. The system of claim 1, wherein the circulation subsystem comprises one or more sprayers to direct the nanobubble solution matrix onto the object.

5. A system comprising:
   a bubble separator including an input to receive a solution matrix comprised of nanobubbles;
   the bubble separator including an upper portion containing a first solution matrix comprising a liquid infused with microbubbles and nanobubbles and a lower portion containing a second solution matrix comprising the liquid infused with nanobubbles and a first output and a second output;
   a circulation subsystem to agitate one or more of an object to be cleaned or a nanobubble solution matrix; and
   a control circuit coupled to the circulation subsystem, wherein the control circuit generates one or more signals to control the circulation subsystem to provide the nanobubble solution matrix to the object; wherein;
   the first output provides the first solution to the circulation subsystem; and
   the second output provides the second solution to the circulation subsystem;
   wherein the second output provides the second solution to the circulation subsystem differently than the first output provides the first solution.

6. A system comprising,
   a circulation subsystem to agitate one or more of an object to be cleaned or a nanobubble solution matrix; and
   a control circuit coupled to the circulation subsystem, wherein the control circuit generates one or more signals to control the circulation subsystem to provide the nanobubble solution matrix to the object;
   wherein the circulation subsystem comprises a wash tank including one or more brushes to circulate the nanobubble solution matrix on the object.

7. A system comprising,
   a circulation subsystem to agitate one or more of an object to be cleaned or a nanobubble solution matrix; and
   a control circuit coupled to the circulation subsystem, wherein the control circuit generates one or more signals to control the circulation subsystem to provide the nanobubble solution matrix to the object;
   wherein the circulation subsystem comprises one or more brushes including bristles having lumens or tubes to deliver the nanobubble solution matrix to the object.

8. A method comprising:
   applying a nanobubble solution matrix to an object;
   agitating the object to generate a clean object;
   providing the clean object to an output;
   infusing one or more gases into a liquid to form an initial solution matrix including microbubbles and nanobubbles;
   separating the initial solution matrix into a first solution matrix including microbubbles and a second solution matrix including predominately nanobubbles; and
   determining a selected ratio of the second solution matrix to the first solution matrix to produce a further solution matrix having a selected mixture of microbubbles and nanobubbles.

9. The method of claim 8, further comprising storing the further solution matrix in a storage tank.

10. The method of claim 9, further comprising separating the initial solution matrix into the first solution matrix and the second solution matrix using a filter.

11. The method of claim 8, wherein infusing the one or more gases into the liquid comprises:
    activating one or more valves to provide a selected gas of the one or more gases to an output;
    activating a gas processing unit coupled to the output to selectively alter one or more properties of the selected gas; and
    combining a liquid received at a first input of a bubble generator with the selected gas received at a second input of the bubble generator to produce the initial solution matrix at the output of the bubble generator.

12. The method of claim 8, wherein the microbubbles of the first solution matrix comprise a first gas composition and nanobubbles of the second solution matrix comprise a second gas composition.

13. A system comprising:

a gas handling subsystem to provide one or more gases;

a bubble generator to infuse a liquid with the one or more gases to produce an initial solution matrix including a liquid infused with microbubbles, nanobubbles, and dissolved gas;

a bubble separator to receive the initial solution matrix, the bubble separator to separate a first solution matrix including the liquid infused with microbubbles from a second solution matrix including the liquid infused with nanobubbles;

one or more first nozzles to provide the first solution matrix to a further unit;

one or more second nozzles to provide the second solution matrix to the further unit, the one or more second nozzles to provide the second solution matrix differently from the first solution matrix provided by the one or more first nozzles;

a circulation subsystem to apply a treatment solution matrix including one or more of the first solution matrix or the second solution matrix to an object, the circulation subsystem to agitate one or more of the object or at least a portion of the treatment solution matrix to clean the object; and a control circuit to control the one or more valves to provide the treatment solution matrix as including a first amount of the first solution matrix and a second amount of the second solution matrix to provide a selected treatment.

14. The system of claim 13, wherein the gas handling subsystem comprises:

a gas source to provide one or more gas compositions;

one or more gas control valves, each gas control valve coupled between the gas source and the bubble generator; and one or more gas processing units including an input coupled to the one or more gas control valves to receive the one or more gas compositions and configured to alter one or more properties of the one or more gas compositions before providing the one or more gas compositions to the bubble generator.

15. The system of claim 13, further comprising a gas recycle line to couple the bubble separator to the gas handling subsystem.

16. The system of claim 13, wherein the control circuit comprises:

an input and output interface; and an analytics module to receive data from the input and output interface, to determine one or more parameters corresponding to the treatment solution matrix, and to provide a control signal to the input and output interface to alter one of the one or more parameters.

17. The system of claim 13, wherein:

the control circuit is configured to control the one or more valves to provide selected amounts the first solution matrix and the second solution matrix to produce the treatment solution matrix having a selected chemical composition;

wherein the microbubbles are formed from a first gas composition and the nanobubbles are formed from a second gas composition.

18. The system of claim 13, further comprising a wash tank including an agitation system having one or more brushes to circulate one or more of the first solution matrix or the second solution matrix on the object.

19. The system of claim 13, further including an agitation system having one or more rotating brushes including bristles having lumens or tubes to deliver one or more of the first solution matrix or the second solution matrix to the object.

* * * * *